(12) United States Patent
Metcalfe et al.

(10) Patent No.: US 7,919,764 B2
(45) Date of Patent: Apr. 5, 2011

(54) METHOD AND APPARATUS FOR ENHANCED TERAHERTZ RADIATION FROM HIGH STACKING FAULT DENSITY

(75) Inventors: Grace D. Metcalfe, Chevy Chase, MD (US); Michael Wraback, Germantown, MD (US); Paul Shen, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 162 days.

(21) Appl. No.: 12/435,797

(22) Filed: May 5, 2009

(65) Prior Publication Data

US 2010/0006780 A1 Jan. 14, 2010

Related U.S. Application Data

(60) Provisional application No. 61/050,890, filed on May 6, 2008.

(51) Int. Cl.
*H01L 33/04* (2010.01)
*H01L 33/28* (2010.01)
*H01L 33/32* (2010.01)

(52) U.S. Cl. .................................. 250/504 R; 257/13

(58) Field of Classification Search .............. 250/504 R, 250/504 H, 493.1, 495.1; 257/12, 13
See application file for complete search history.

(56) References Cited

U.S. PATENT DOCUMENTS 7,335,908 B2 * 2/2008 Samuelson et al. .............. 257/12

OTHER PUBLICATIONS

F. Bernardini, V. Fiorentini, and D. Vanderbilt, "Spontaneous polarization and piezoelectric constants of III-V nitrides," Phys. Rev. B 56(16), R10024-27 (1997).

D. Turchinovich, B. S. Monozon, and P. Uhd Jepson, "Role of dynamical screening in excitation kinetics of biased quantum wells: Nonlinear absorption and ultrabroadband terahertz emission," J. Appl. Phys. 99, 013510 (2006).

J. Wu, W. Walukiewicz, K. M. Yu, J. W. Ager III, E. E. Haller, H. Lu, W. J. Schaff, Y. Saito, and Y. Nanishi, "Unusual properties of the fundamental band gap of InN," Appl. Phys. Lett. 80, 3967 (2002).

G. Koblmüller, C. S. Gallinat, S. Bernardis, J. S. Speck, G. D. Chern, E. D. Readinger, H. Shen, and M. Wraback, "Optimization of the surface and structural quality of N-face InN grown by molecular beam epitaxy," Appl. Phys. Lett. 89, 071902 (2006).

C. S. Gallinat, G. Koblmüller, J. S. Brown, S. Bernardis, J. S. Speck, G. D. Chern, E. D. Readinger, H. Shen, and M. Wraback, "In-polar InN grown by plasma-assisted molecular beam epitaxy," Appl. Phys. Lett. 89, 032109 (2006).

(Continued)

*Primary Examiner* — Jack I Berman
(74) *Attorney, Agent, or Firm* — Lawrence E. Anderson

(57) ABSTRACT

A method and device for generating terahertz radiation comprising a polar crystal material layer operative to emit terahertz radiation; the polar crystal material layer comprising a plurality of stacking faults; the stacking faults lying substantially perpendicular to the polar axis and forming boundaries at which the internal electric polarization terminates leading to charges accumulating at the boundaries, and creation of internal electric fields oriented along the polar axis; a pulsed radiation source for creating photogenerated carriers in the polar crystal material; whereby the photogenerated carriers accelerate in the internal electric fields associated with the termination of the internal electric polarization by the stacking faults to thereby generate terahertz radiation.

20 Claims, 29 Drawing Sheets

OTHER PUBLICATIONS

T. Takeuchi, S. Sota, M. Katsuragawa, M. Komori, H. Takeuchi, H. Amano, and I. Akasake, "Quantum-Confined Stark Effect due to Piezoelectric Fields in GaInN Strained Quantum Wells," Jpn. J. Appl. Phys., Part 2 36, L382 (1997).

F. Della Sala, A. DiCarlo, P. Luigi, F. Bernardini, V. Fiorentini, R. Scholz, and J.-M. Jancu, "Free-carrier screening of polarization fields in wurtzite GaN/InGaN laser structures," Appl. Phys. Lett. 74, 2002 (1999).

G. D. Chern, E. D. Readinger, H. Shen, M. Wraback, C. S. Gallinat, G. Koblmuller, and J. S. Speck, "Excitation wavelength dependence of terahertz emission from InN and InAs," Appl. Phys. Lett. 89, 141115 (2006).

K. Liu, J. Xu, T. Yuan, and X.-C. Zhang, "Terahertz radiation from InAs induced by carrier diffusion and drift," Phys. Rev. B 73, 155330 (2006).

D. Turchinovich, P. Uhd Jepsen, B. S. Monozon, M. Koch, S. Lahmann, U. Rossow, and A. Hangleiter, "Ultrafast polarization dynamics in biased quantum wells under strong femtosecond optical excitation," Phys. Rev. B 68, 241307 (R) (2003).

T. Tansky et al, "Optical Band Gap of Indium Nitride," J. Appl. Phys. 59, 3241 (1986).

Ahn, H. et al. "Intense terahertz emission from a-plane InN surface," Applied Physics Letters, vol. 92, Issue 10, id. 102103-1 to 102103-3 (2008).

S. Hoffman, et al., "Generation of Terahertz Radiation with Two Color Semiconductor Lasers," Laser & Photon. Rev. No. 1, 44-56 (2007).

A. Nahata, "Coherent Detection of Freely Propagating Terahertz Radiation by Electro-optic Sampling," App. Phys. Lett. 68 pp. 150-152 (Jan. 8, 1996).

D. H. Austin, "Picosecond optoelectronics switching and gating in silicon," Appl. Phys. Lett. 26, No. 3, pp. 101-103, (1975).

O. Ambacher, et al.,"Pyroelectric properties of Al(In)GaN/GaN hetero- and quantum well structures," J. Phy. Condens. Matter 14 3399-3434 (2002).

J. Shan, et al. "Origin of magnetic field enhancement in the generation of terahertz radiation from semiconductor surfaces," Optics Letters, vol. 26, Issue 11, pp. 849-851 (Jun. 2001).

G.F. Neumark, "Theory of the Anomalous Photovoltaic Effect of ZnS," Physical Review, 125:838 (1962).

A. I. Grachev et al., "On the macroscopic and microscopic origin of the photovoltaic effect in YBCO thin films," Physica C 288 (1997) 268-276.

S. Juillaguet, et al. "Cathodoluminescence investigation of stacking faults extension in 4H SiC," Physica Status Solidi (a)204, No. 7 (2007), 2222-2228.

J.A. Majewski, et al., "Polarization and band offsets of stacking faults in AlN and GaN," MRS Internet, J. Nitride Semicond. Res. 3, 21 (1998).

J.A. Majewski, et al. Phys. Stat. Sol. "Novel Nitride Devices Based on Polarization Fields," A 179, 285 (2000).

M.D. Craven, et al. "Microstructural evolution of a-plane GaN grown on a-plane SiCby metalorganic chemical vapor deposition," Applied Physics Letters, vol. 84, No. 8 23 1281 (2004).

B.A. Haskell, et al. "Microstructure and enhanced morphology of planar nonpolar m-plane GaN grown by hydride vapor phase epitaxy," J. Electron. Mater. 34, 357 (2005).

M. Tani, et al., "Emission characteristics of photoconductive antennas based on low-temperature-grown GaAs and semi-insulating GaAs" Appl. Opt. 36, 7853 (1997).

K. Sakai editor, "Terahertz Optoelectronics, Topics Applied Physics," "Introduction to Terahertz Pulses," by Sakai, pp. 1-30 and "TerahertzRadiation From Semiconductor Surfaces," by Ping Gu, et al., pp. 63-97, published by Springer (2005).

H. Iwata, U. Lindefelt, S. Oberg, and P. R. Briddon, "Localized electronic states around stacking faults in silicon carbide," Phys. Rev. B 65(3), 033203 (2002), Dec. 28, 2001.

M.B. Johnston, "Simulation of Terahertz Generation at Semiconductor Surfaces," Physical REview 8, vol. 65, 165301 (65 165301-1), Mar. 18, 2002.

Z.W. Yan, "Intermediate-Coupling Polaron Properties in Wurtzite Nitride Semiconductors," Physics Letters A, vol. 326, Issues 1-2, pp. 157-165, May 31, 2004.

* cited by examiner

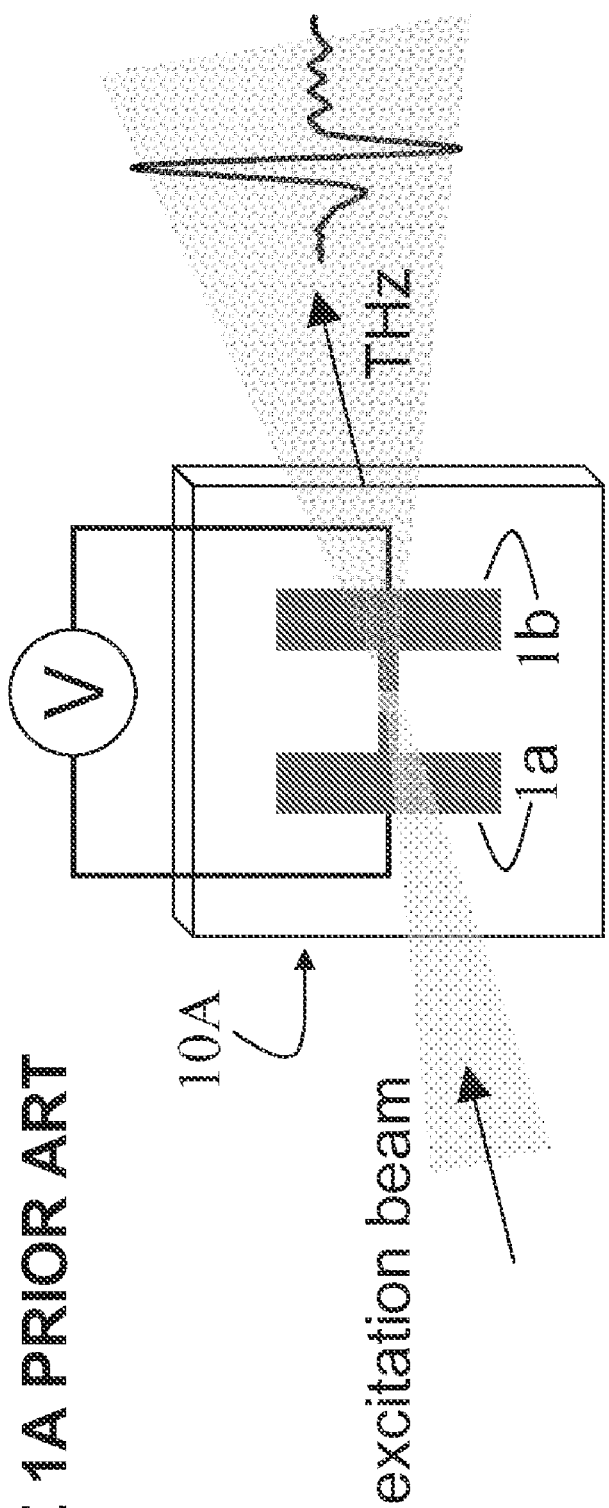

FIGURE 3 – Orientation of Crystal Structure (C-axis) Comparison of Polar and non-polar material
Polar: c-axis *parallel* to growth direction (c-axis *perpendicular* to growth plane)
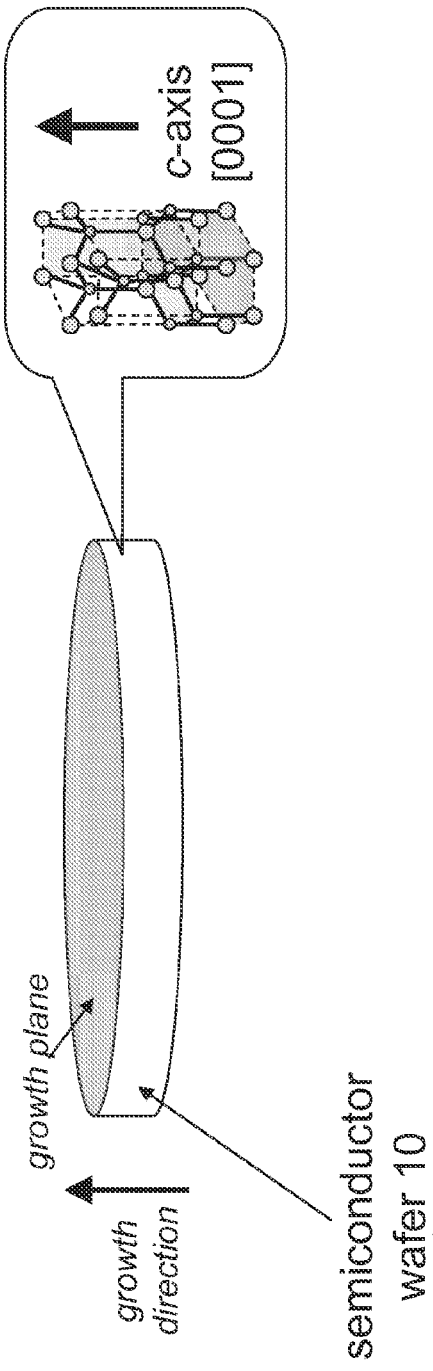
Non-polar: c-axis *perpendicular* to growth direction (c-axis *parallel* to growth plane)
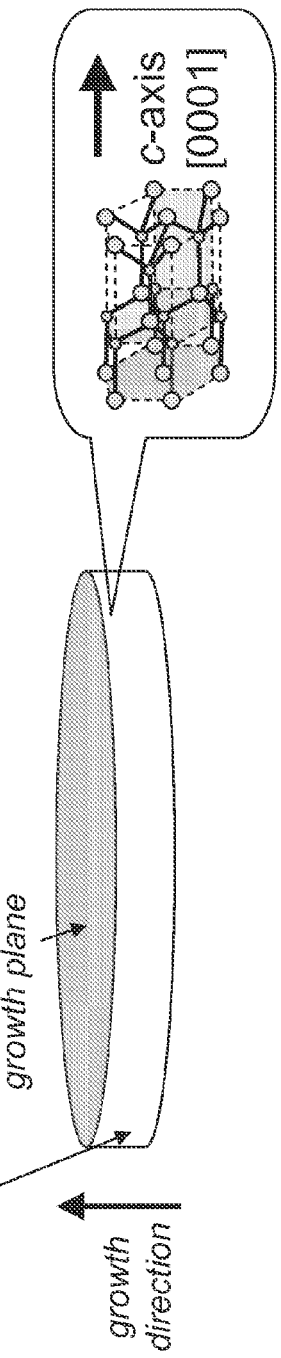

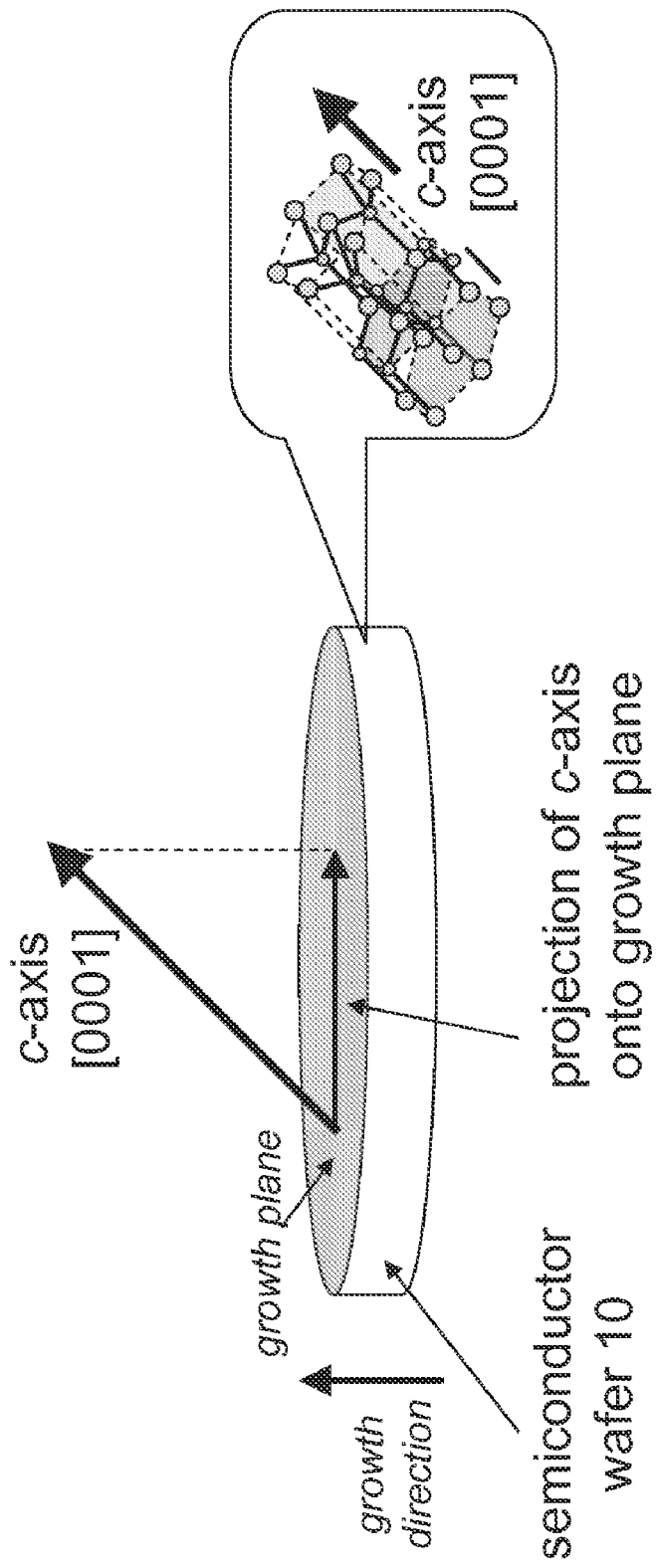
FIGURE 4 – Orientation of Crystal Structure (C-axis) Semipolar material

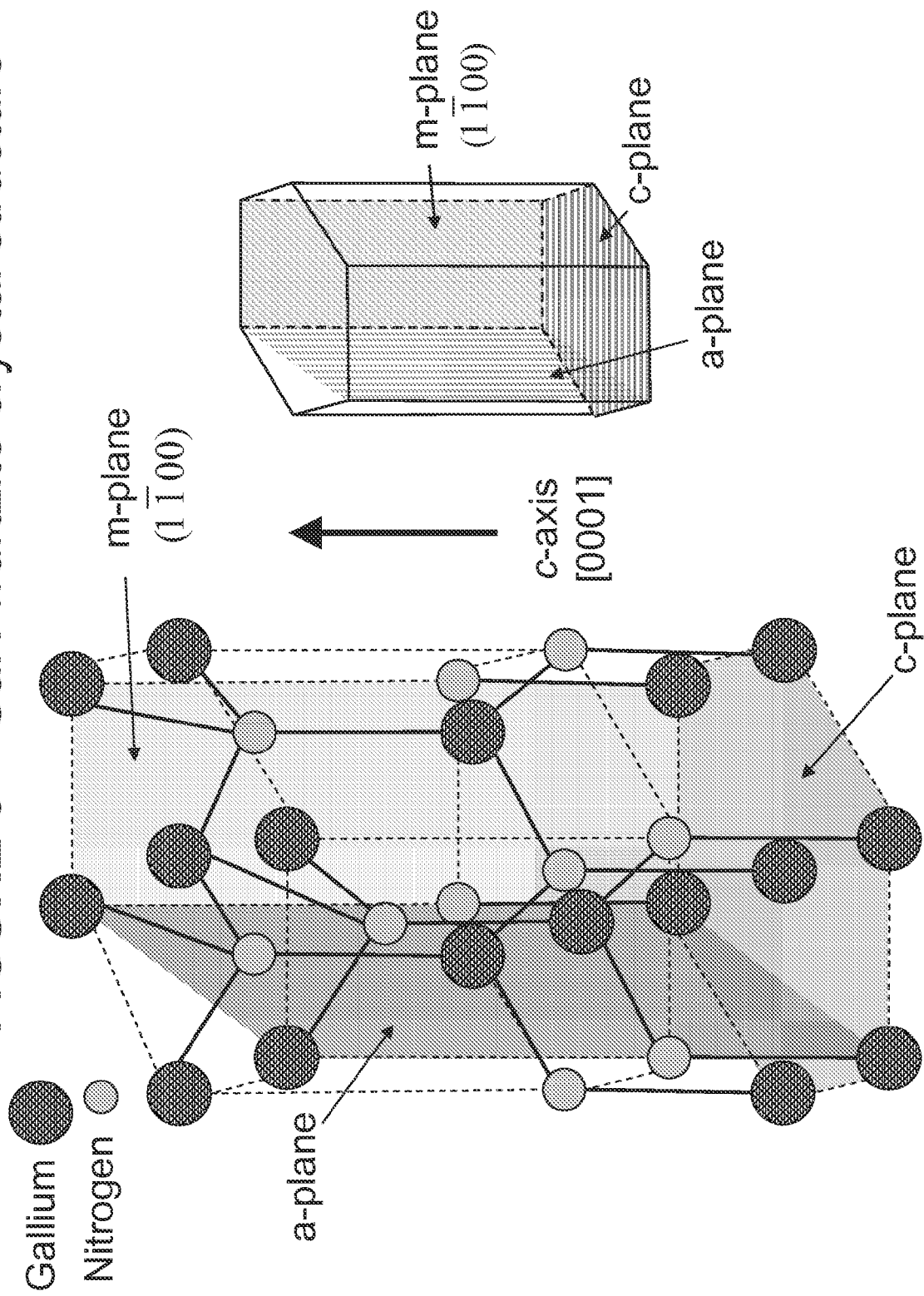
FIGURE 6 – GaN wurtzite crystal structure

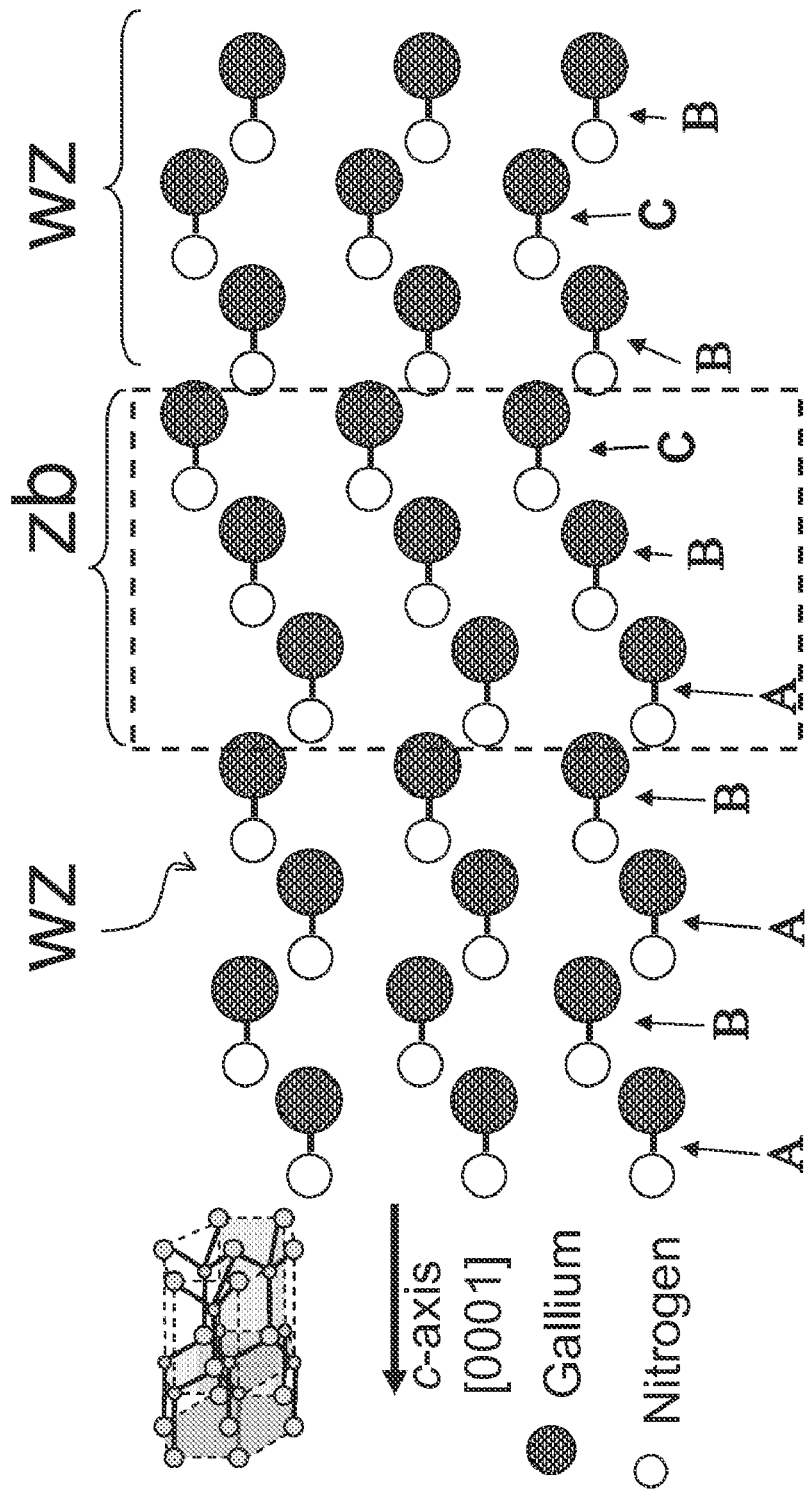
FIGURE 7 - Type I basal plane stacking fault (zinc blende region) Wurtzite=> repetitions of 2 (AB) or (BC); Zinc Blende => (ABC) type I (predominate); (ABCABC) type II

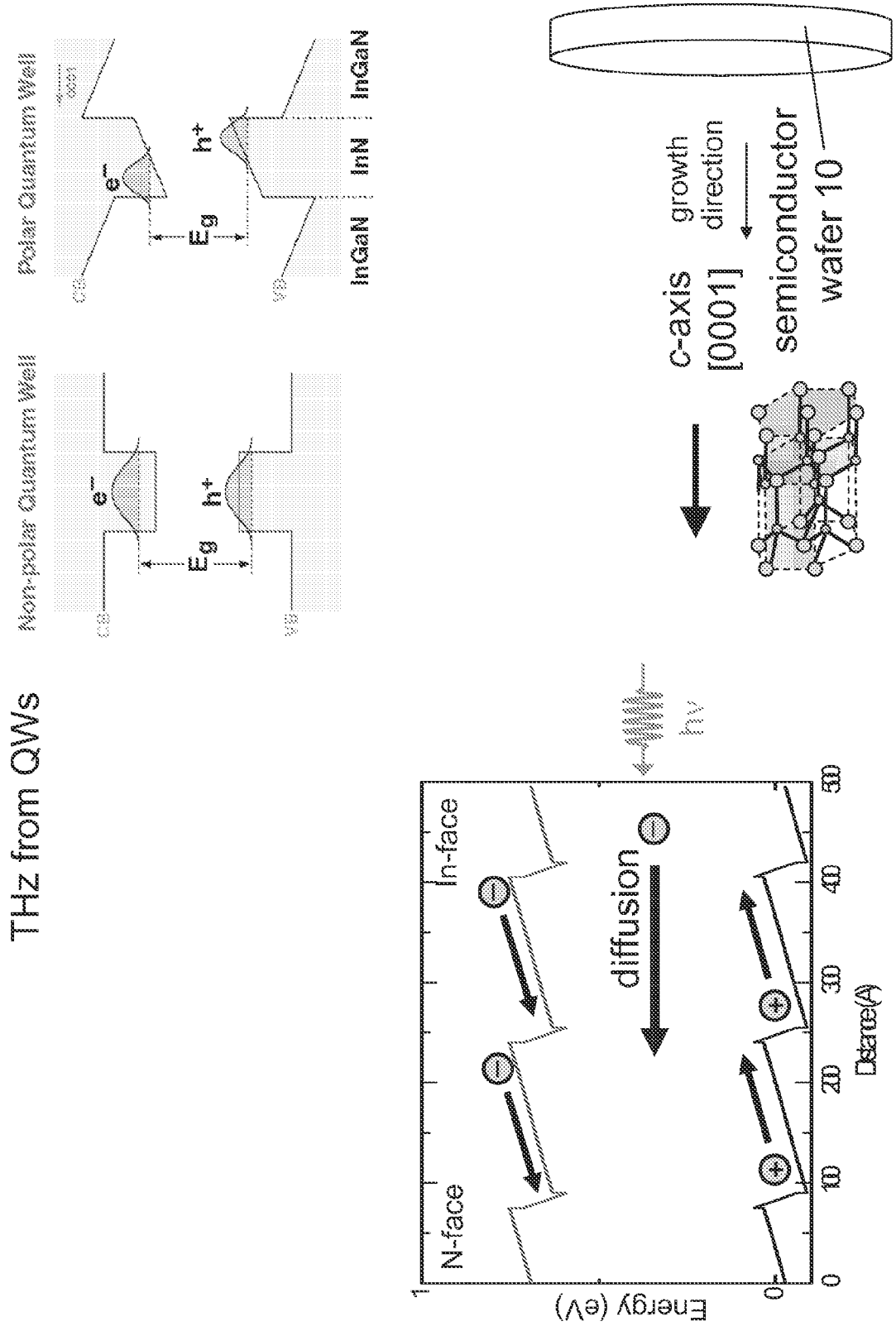
FIGURE 10 - Example: Multiple quantum wells (MQWs) THz from QWs

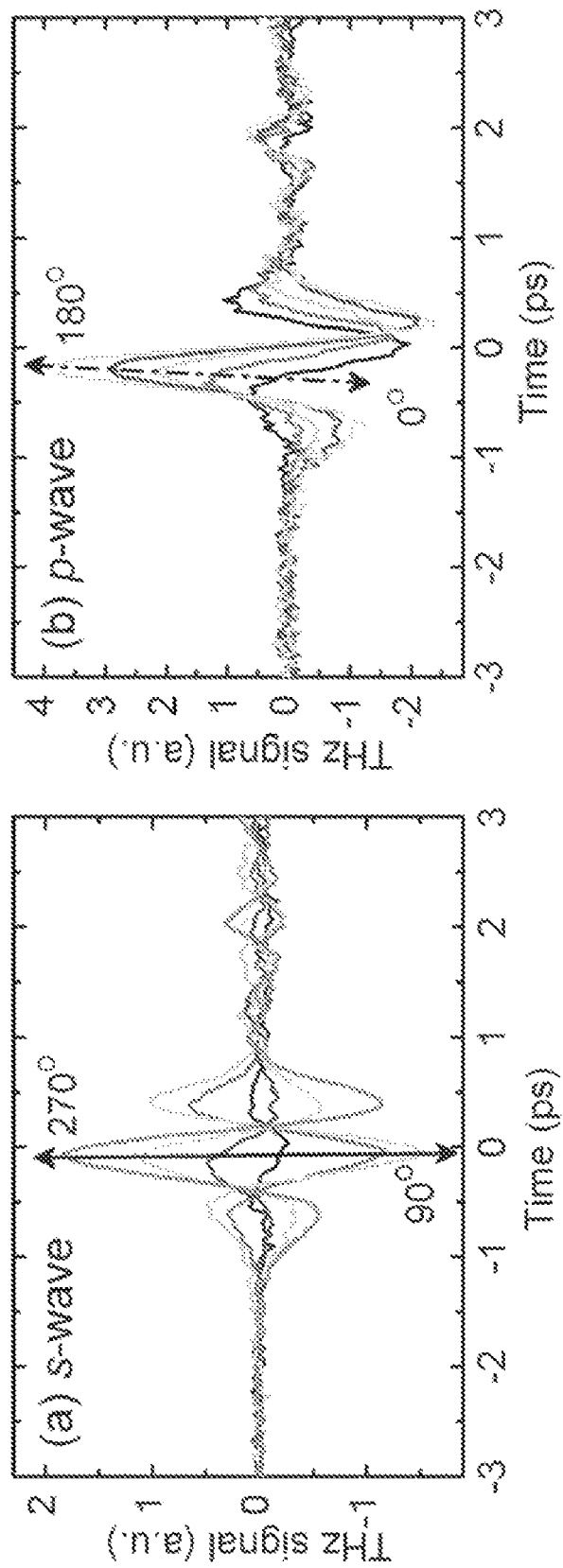

FIGURE 14(A) and 14(B) Time-resolved (A) s- and (B) p-polarized THz signal from the low carrier concentration m-GaN epilayer grown by MOCVD which has a stacking fault (SF) density of 1 × 10$^6$ cm$^{-1}$. Only the high SF-density sample with the largest THz radiation is shown. The samples are optically excited by femtosecond laser pulses at 266 nm. Sample rotation angles ranging between from 0 to 360 degrees shown in color.

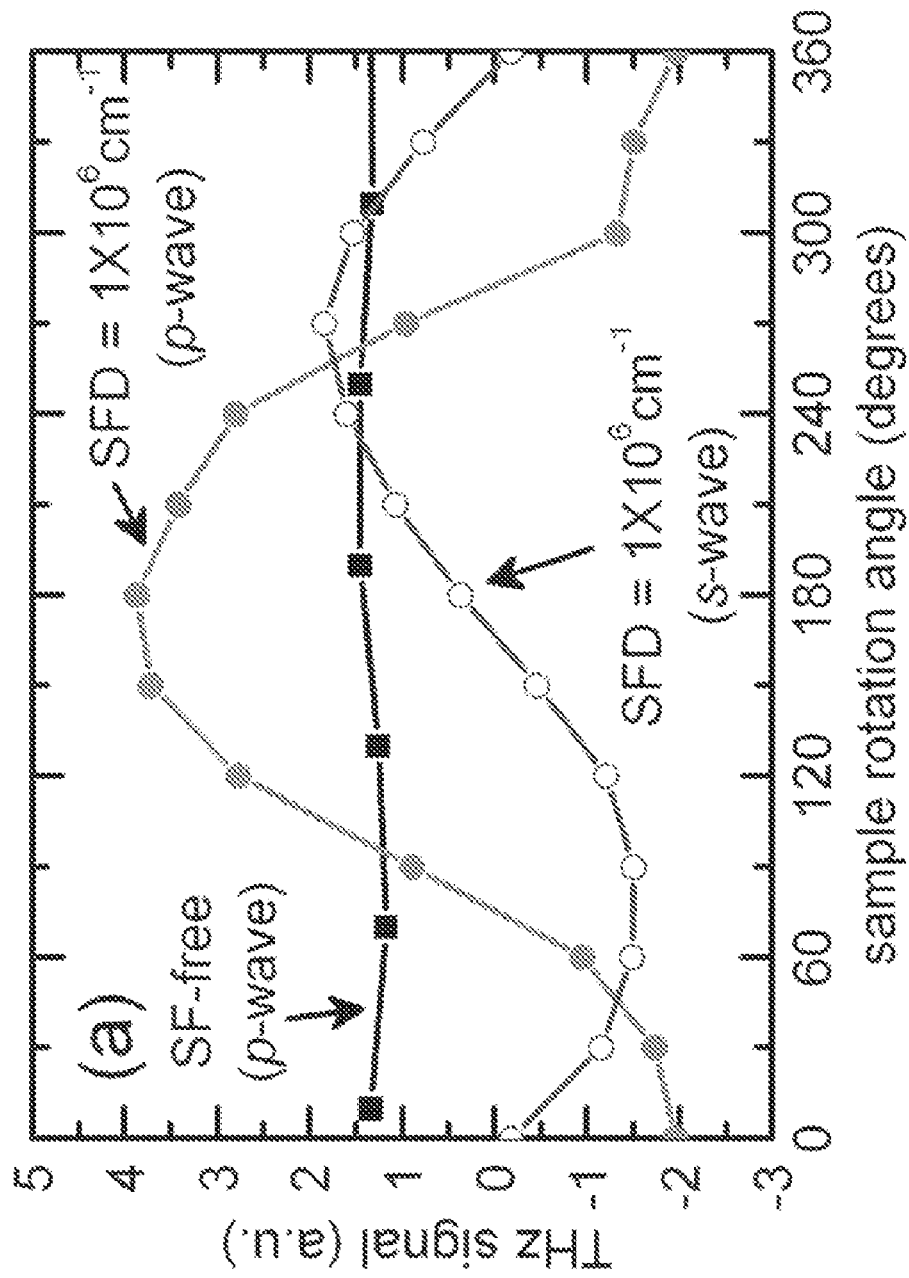
Figure 15 Sample rotation angle dependence of the peak THz signal amplitude from *m*-GaN, which has a SF-density of 1 X 10⁶ cm⁻¹ (red and blue curves) and is stacking fault free (black curve).

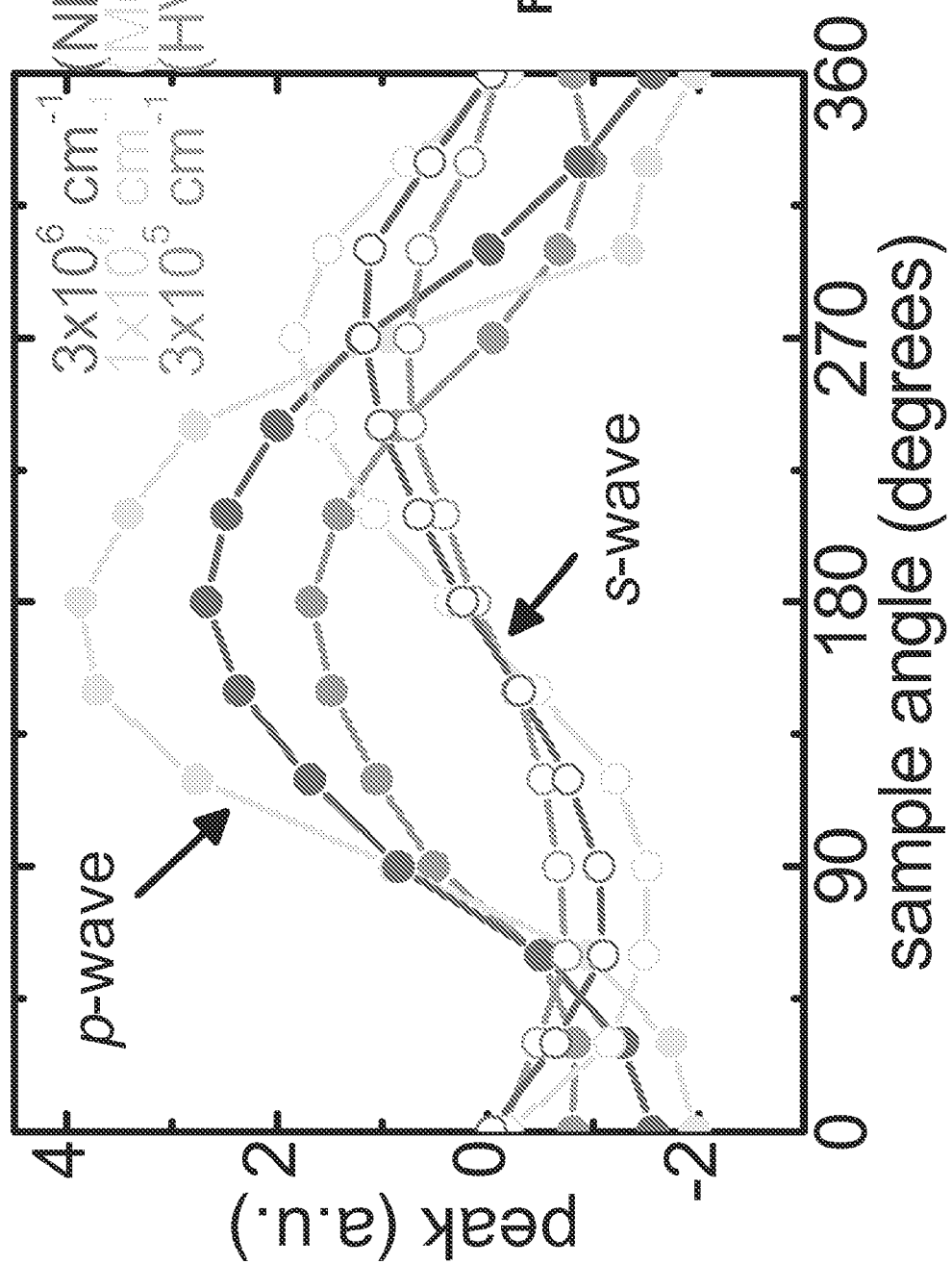

[11-20] cross-section TEM image of *m*-GaN grown by MOCVD (SFD ~ $10^6$/cm)

FIGURE 19 THz data

FIGURE 21   THz from m-plane InN

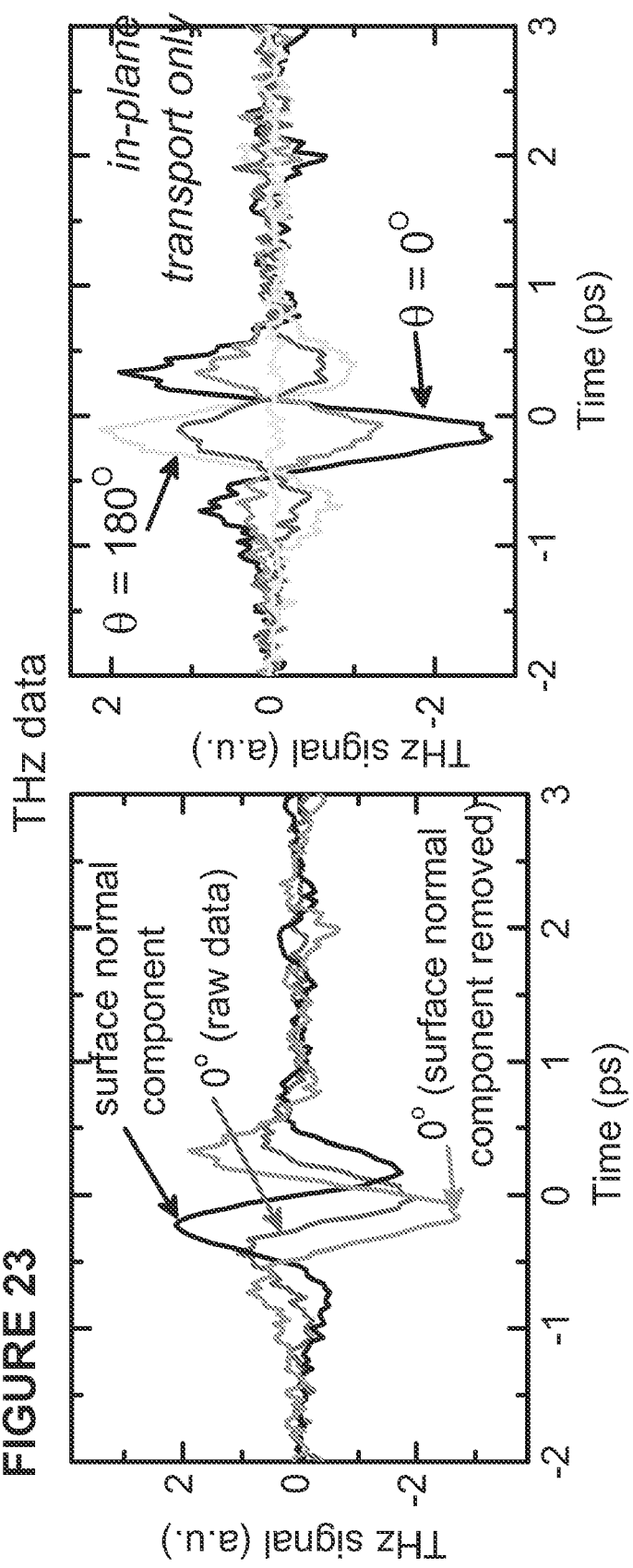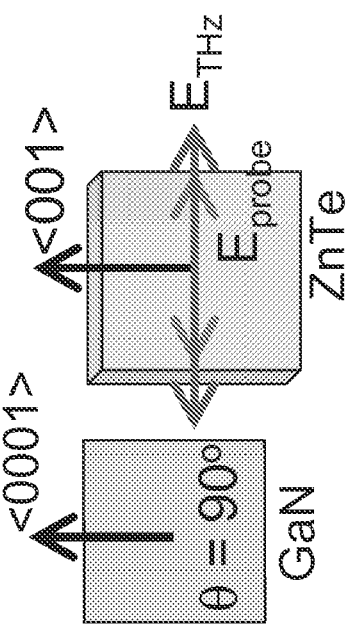
FIGURE 23

METHOD AND APPARATUS FOR ENHANCED TERAHERTZ RADIATION FROM HIGH STACKING FAULT DENSITY

CROSS-REFERENCE TO RELATED APPLICATIONS

This application claims priority of U.S. Provisional Patent Application Ser. No. 61/050,890 filed May 6, 2008, which is incorporated herein by reference.

GOVERNMENT INTEREST

The invention described herein may be manufactured, used, and/or licensed by or for the United States Government.

FIELD OF THE INVENTION

This invention relates generally to radiation emitting crystals, and more particularly to crystal structures which provide a source of terahertz radiation.

BACKGROUND OF THE INVENTION

Electromagnetic waves sent at terahertz frequencies, known as terahertz radiation, terahertz waves (THz) rays, occur in the region of the electromagnetic spectrum between 300 gigahertz ($3\times10^{11}$ Hz) and 3 terahertz ($3\times10^{12}$ Hz), and correspond to the wavelength range of between 1 millimeter (high-frequency edge of the microwave band) and 100 micrometer (long-wavelength edge of far-infrared light).

THz-rays, which are shorter than microwaves and longer than infrared, have potential usage in biomedical and security applications in that THz-rays are safe, and non-ionizing, and can pass through such materials as clothing, paper, cardboard, wood, masonry, plastic, ceramics, as well as penetrate fog and clouds. THz radiation is safe for biological tissues (unlike X-rays), and images can be formed with terahertz radiation having resolution of less than 1 mm. THz radiation has potential spectroscopic uses in that while many materials are transparent to THz, many materials exhibit unique spectral identifiers when exposed to terahertz radiation, including explosives, pharmaceuticals, and illegal narcotic substances. Accordingly, items of interest can be observed through normally visually opaque intervening layers, such as packaging and clothing. To date, THz rays have not yet been widely used, partly, because of the difficulty in producing them at sufficient intensity. For example, in the journal article entitled, "Generation of Terahertz Radiation with Two Color Semiconductor Lasers," Hoffman and Hoffman, Laser and Photonics Reviews, Rev. 1, No. 1, 44-56 (available on-line Feb. 13, 2007) (hereinafter Hoffman & Hoffman) though time-domain THz spectroscopy has been shown to be extremely powerful, it suffers from its enormous price (at least $200,000) and complexity, which restricts the use of the system.

DESCRIPTION OF THE RELATED ART

Previous approaches to terahertz radiation devices have used photoconductive switches in conjunction with a semiconductor comprising two parallel metal strips on the surface separated by a small distance (hundreds of microns to a few millimeters). A schematic illustration of such a configuration is shown in FIG. 1A. These metal strips act as electrodes, across which a large voltage (up to kV) is applied, creating electric fields as large as 10 kV/cm. The semiconductor material is highly restrictive, such that virtually no current flows without illumination. When the gap between the electrodes is illuminated with an approximately 100 femtosecond pulse of photon energy larger than the fundamental bandgap of the semiconductor, electron-hole pairs are created and swept out in the high field, producing a transient current that generates a THz pulse with usable bandwidth beyond 1 THz. The energy of the THz pulse is proportional to the square of the bias field. One disadvantage of this approach is that metal electrodes with kV voltages across them must be used to create THz radiation. Another disadvantage is that the external bias voltage, and therefore the THz pulse energy, is limited by dielectric breakdown in air to less than 300 kV/cm in theory, but in practice 100 kV/cm is rarely exceeded. Terahertz (THz) radiation in conventional devices is commonly generated through in-plane carrier acceleration in electric fields utilizing externally biased photoconductive (PC) switches, a surge-current normal to the surface due to a built-in surface field, or the photo-Dember field. Although the geometry of the biased photoconductive antennas is more favorable for coupling out the THz radiation than that for other semiconductor-based THz sources employing transport normal to the surface, these photoconductive switches require electrode processing and an external bias voltage, which is limited by the dielectric strength of air, to establish an in-plane electric field.

An alternative optical THz generation approach creates narrow band radiation through the mixing of continuous-wave (CW) lasers separated in frequency by the desired terahertz difference frequency in a semiconductor photomixer. Most photomixers use low-temperature grown GaAs thin films as the active layer due to its short carrier lifetime (approximately 0.5 ps), large breakdown-field threshold (>300 kV/cm) and high carrier mobility (~200 $cm^2/V\cdot s$).

THz emission from quantum wells (QWs) has been observed from GaAs/AlGaAs single QWs, low indium concentration InGaN/GaN multiple quantum wells (MQWs), and high indium concentration InN/InGaN MQWs. THz emission in conventional devices is governed by carrier diffusion or surface surge-currents normal to the surface.

SUMMARY OF THE INVENTION

In consideration of the problems described above, an object of the present invention is to provide an improved source of terahertz (THz) radiation that will provide significantly more terahertz power than that which can be obtained using current state of the art photoconductive switches. In a preferred embodiment, a polar crystal material is excited by an emission source, such as for example, a 100 femtosecond pulse source. The polar crystal material has stacking faults (SFs) grown along a nonpolar direction to create high internal fields that result from termination of the spontaneous polarization along the in-plane c-axis of the polar crystal material. Such stacking faults may be created, for example, during the course of the heteroepitaxial growth of the crystals on non-native substrates, whereby large densities (in the range of $10^3$ to $10^7$ per cm) of these stacking faults are generated, primarily perpendicular to the polar c-axis. The internal electric fields created by the stacking faults may exceed those that can be obtained using large externally applied voltages in conventional, large aperture photoconductive switches, which are constrained by dielectric breakdown in air. Unlike photoconductive strips, the present invention requires substantially no elaborate etching during fabrication, making easier to fabricate than photoconductive switches because it does not require metal contacts. Moreover, the present invention requires no external voltage source. In a preferred embodiment, the stacking faults are substantially equally spaced.

Polar crystal materials, which may be semiconductors, developed using the principles of the present invention use nonpolar growth directions to create in-plane spontaneous and piezoelectric polarizations that are terminated at stacking faults to produce large in-plane internal electric fields. In effect, the structure creates an array of contactless photoconductive nano switches that create coherent additive THz fields under femtosecond pulse illumination.

The polar crystal material layer constructed in accordance with the principles of the present invention can be wurtzite GaN, InN, AlN, or alloys thereof. The polar crystal material layer can also be ZnO, MgO, ZnS, ZnSe, ZnTe, or alloys thereof. In addition, SiC may be utilized as the polar crystal material layer. The orientation of the crystal structure may be nonpolar with the a-plane or m-plane as the growth plane, or semipolar, where a projection of the c-axis is in the growth plane, as shown for example in FIG. 4. Strained wurtzite InN, GaN, AlN, or alloys thereof with a different lattice constant than the first wurtzite layer of InN, GaN, AlN or alloys thereof can be grown atop the first layer to create an additional piezoelectric field.

The present invention results in spectrally broadened emission and greater efficiency of emitting devices. The p-polarized (s-polarized) THz radiation measured from the high stacking fault density samples reaches its maximum and minimum when the c-axis is parallel or antiparallel with the p-polarization (s-polarization) detection direction, respectively.

A preferred method provides a stacking fault density in the approximate range of $10^3$ to $10^7$ per centimeter producing an average electric field in the approximate range of 3 to 1800 kV/cm.

In order to attain the objectives described above, according to the present invention, there is provided an apparatus and methodology whereby enhanced levels of terahertz radiation are obtainable.

BRIEF DESCRIPTION OF THE DRAWINGS

The present invention can best be understood when reading the following specification with reference to the accompanying drawings, which are incorporated in and form a part of the specification, illustrate alternate embodiments of the present invention, and together with the description, serve to explain the principles of the invention. In the drawings:

FIG. 1A is an illustration of a prior art photoconductive switch device for producing terahertz radiation.

FIG. 3 illustrates a comparison of the relative orientations of the crystal structure for polar and nonpolar materials; and in particular, the orientation of the c-axis relative to the growth plane and growth direction. Non-polar orientation occurs when the c-axis is parallel to the growth plane.

FIG. 4 illustrates the relative orientations of the crystal structure for a semi-polar material relative to the growth plane. For the semi-polar structure utilized in conjunction with the present invention, the vector projection of the c-axis onto the growth plane is of a non-zero magnitude, as shown in FIG. 4.

FIG. 6 is a depiction of the crystal lattice structure for GaN showing the c-plane, c-axis, a-plane and m-plane, as further exemplified in the hexagonal lattice structure depicted on the right.

FIG. 7 is an illustration showing discontinuances in a GaN wurtzite structure caused by a type $I_1$ stacking fault comprising zincblende (ZB) domain.

FIG. 8 is an illustration of charge accumulation due to stacking faults in a highly polar GaN. The buildup of charge at the stacking fault interfaces establishes an electric field in the [0001] direction. Carriers excited by a femtosecond optical pulse drift in the internal electric field. Calculations based on a SF density of $1 \times 10^6$ cm$^{-1}$ which are $I_1$ type show an average field in the wurtzite region of ~270 kV/cm.

FIG. 10 is a depiction of polar and nonpolar quantum wells associated with an InGaN/InN/InGaN structure.

FIGS. 11A and 11B show measurements using an excitation wavelength of 266 nm and 350 nm, respectively. There is a diminished terahertz signal from the SF-free sample at the longer excitation wavelength due to less excess electron energy and increased absorption depth. The SF component may be isolated by choosing the right excitation wavelength or by using quantum wells or other heterostructures to restrict surface normal transport. FIG. 11A also illustrates the terahertz emission from SF-free m-plane GaN at various sample rotation angles and shows no sample rotation angle dependence of the terahertz emission, consistent with terahertz emission due to surface normal photocurrents.

FIGS. 14A and 14B illustrate graphically time-resolved (A) s- and (B) p-wave THz signals from an m-plane GaN epilayer grown by MOCVD which has a stacking fault (SF) density of $1\times10^6$ cm$^{-1}$, under 266 nm excitation, at sample rotation angles ranging between 0° to 360°. The p-wave terahertz signal shows phase and amplitude asymmetry due to surface normal transport.

FIG. 15 graphically illustrates the sample rotation angle dependence of the peak THz signal amplitude from an m-plane GaN epilayer, which has a SF-density of $10^6$ cm$^{-1}$ (solid circles denotes p-wave curve and white circles denote s-wave curve) and is stacking fault free (square blocks).

FIG. 16 is a graphical illustration of p-wave and s-wave THz signal emission versus sample angle degrees from m-plane GaN samples with a SFD of $3\times10^5$ cm$^{-1}$, $1\times10^6$ cm$^{-1}$, and $3\times10^6$ cm$^{-1}$. The smaller THz signal from sample with a SFD of $3\times10^6$ cm$^{-1}$ may be due to screening by background carriers, decreased absorption with increased field, or smaller dipole.

FIG. 23 illustrates how the time-resolved THz signal component due to surface normal transport can be separated out. FIG. 23 shows time-resolved p-polarized THz wave signal from the high SF-density m-plane GaN (a) at 0° sample rotation before and after subtraction of the surface normal transport component and (b) at sample rotation angles ranging from 0° to 360° after subtraction of the surface normal transport component. FIG. 18 may be juxtaposed to show sample rotation angle dependence of the peak p- and s-polarized emitted electric field from m-plane GaN (stack fault density=$1\times10^6$ cm$^{-1}$). The p-polarized THz signal has been corrected for surface normal transport.

DETAILED DESCRIPTION OF THE PREFERRED EMBODIMENTS

Figure 2A:
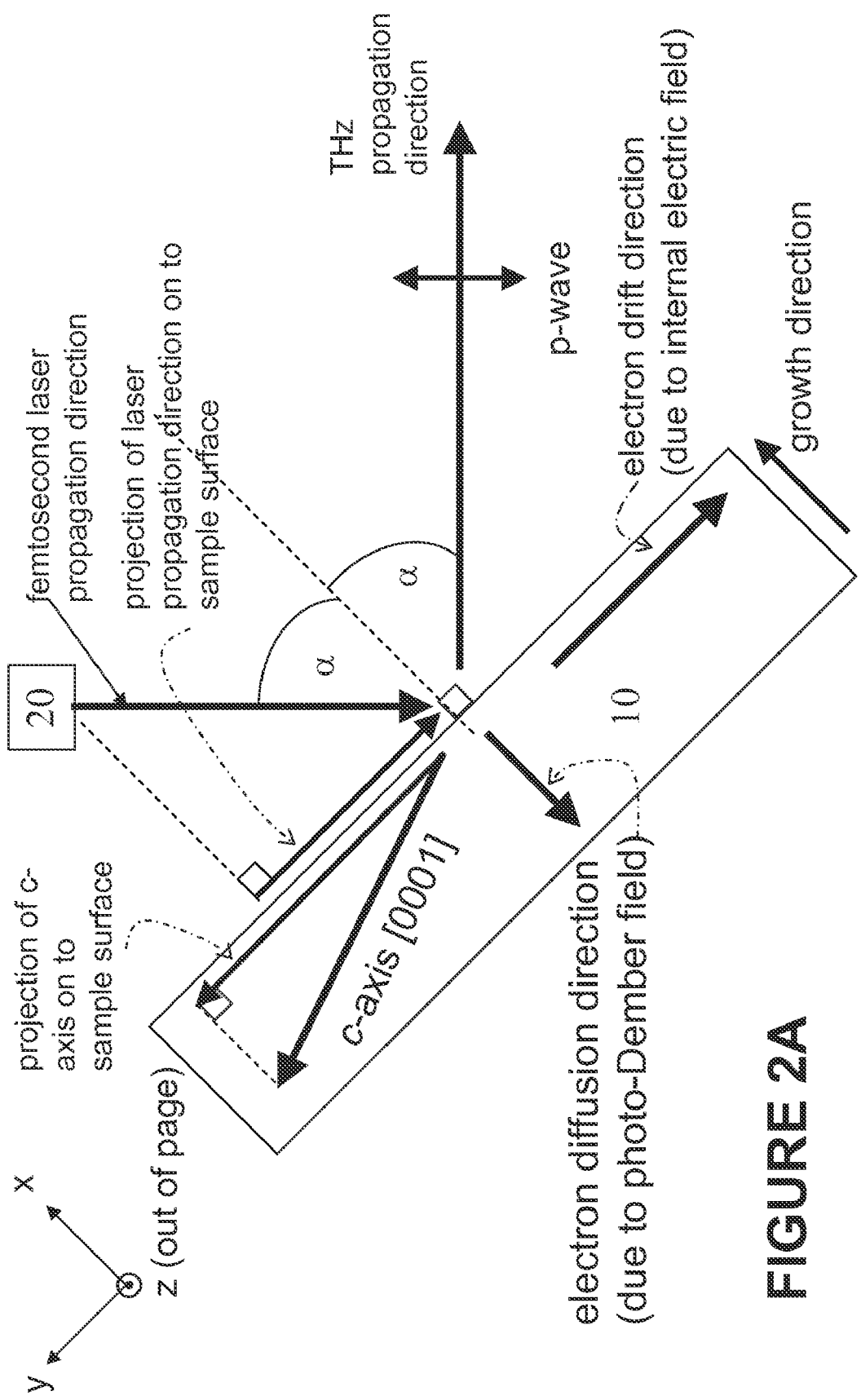
FIG. 2A illustrates a preferred embodiment orientation of a femtosecond pulsed laser source relative to a semiconductor crystal 10, and the terahertz beam produced by the reflected wave.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, an etched region illustrated as a rectangle will, typically, have tapered, rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

Figure 2B:
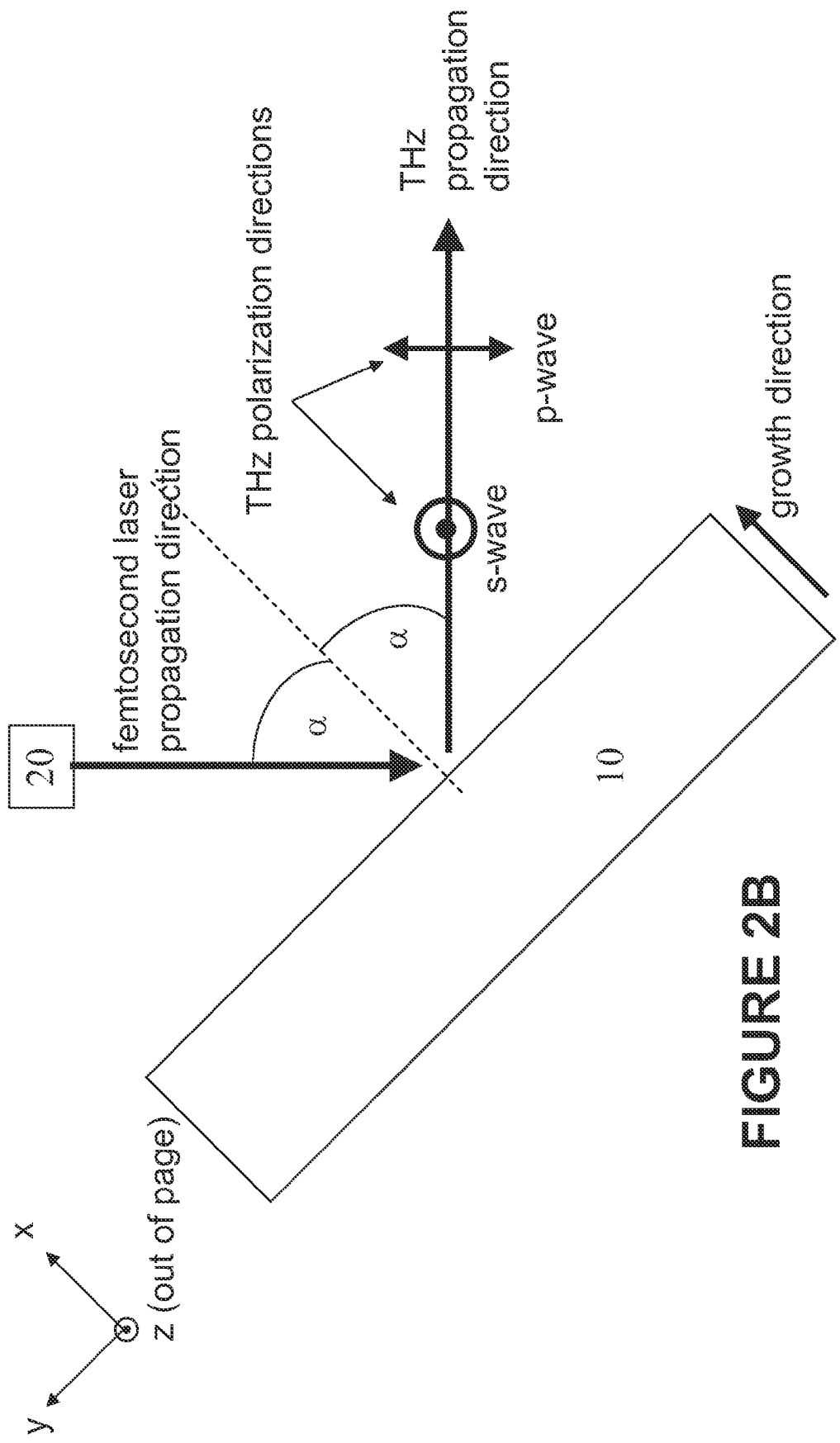
FIG. 2B illustrates the p-wave and s-wave orientations. The term p-wave and s-wave refers to the polarization parallel and perpendicular to the plane of incidence, respectively. Both polarizations demonstrate a sin θ dependence on sample rotation angle θ, but with a 90° shift between the polarizations.

The present invention relates to Terahertz (THz) emission by a semiconductor 10 upon excitation by a femtosecond laser source 20, as shown schematically in FIG. 2A. FIG. 2B illustrates the directions of the p-polarized and s-polarized components of the terahertz waveform produced by laser excitation of the semiconductor crystal structure 10. As recognized by those of ordinary skill in the art, a femtosecond is $10^{-15}$ seconds and a femtosecond laser is a laser that operates in the domain of femtoseconds. The most preferable excitation source 20 is a low cost, compact, femtosecond fiber laser operating at either 1030 nm or 1560 nm (fundamental), or 515 nm or 780 nm (second harmonic). Preferably the pulsed radiation source has a photon energy greater than the bandgap of the crystal material. During photo excitation, a photo-Dember field can occur at the surface of a semiconductor due to a difference in diffusion coefficients for electrons and holes, and a structural asymmetry. Typically, electrons have a larger diffusion coefficient than holes. Consequently, upon photoexcitation, electrons diffuse more rapidly than the holes. In the absence of a surface boundary, no net dipole field is observed, since the center of charge does not change.

One aspect of the present invention is the recognition of polarized terahertz (THz) emission from nonpolar GaN, or the like, due to carrier transport in internal in-plane electric fields created by the termination, at stacking faults, of the in-plane polarization. Observation of a flip in the THz waveform polarity with a reversal in c-axis orientation indicates a reversal of photoelectric charge acceleration direction, consistent with built-in electric field along the c-axis in the nonpolar nitride semiconductor. This polarized THz emission, for horizontal c-axis, can lead to significant enhancement of the THz radiation usually observed due to carrier diffusion normal to the sample surface.

Calculations by Majewski, et al., in "Polarization and band offsets of stacking faults in AlN and GaN," MRS Internet J. Nitride Semicond. Res. 3, 21 (1998), tend to show the charge accumulation in GaN results primarily from the spontaneous polarization, while the contribution from the piezoelectric polarization is negligible.

Figure 8:
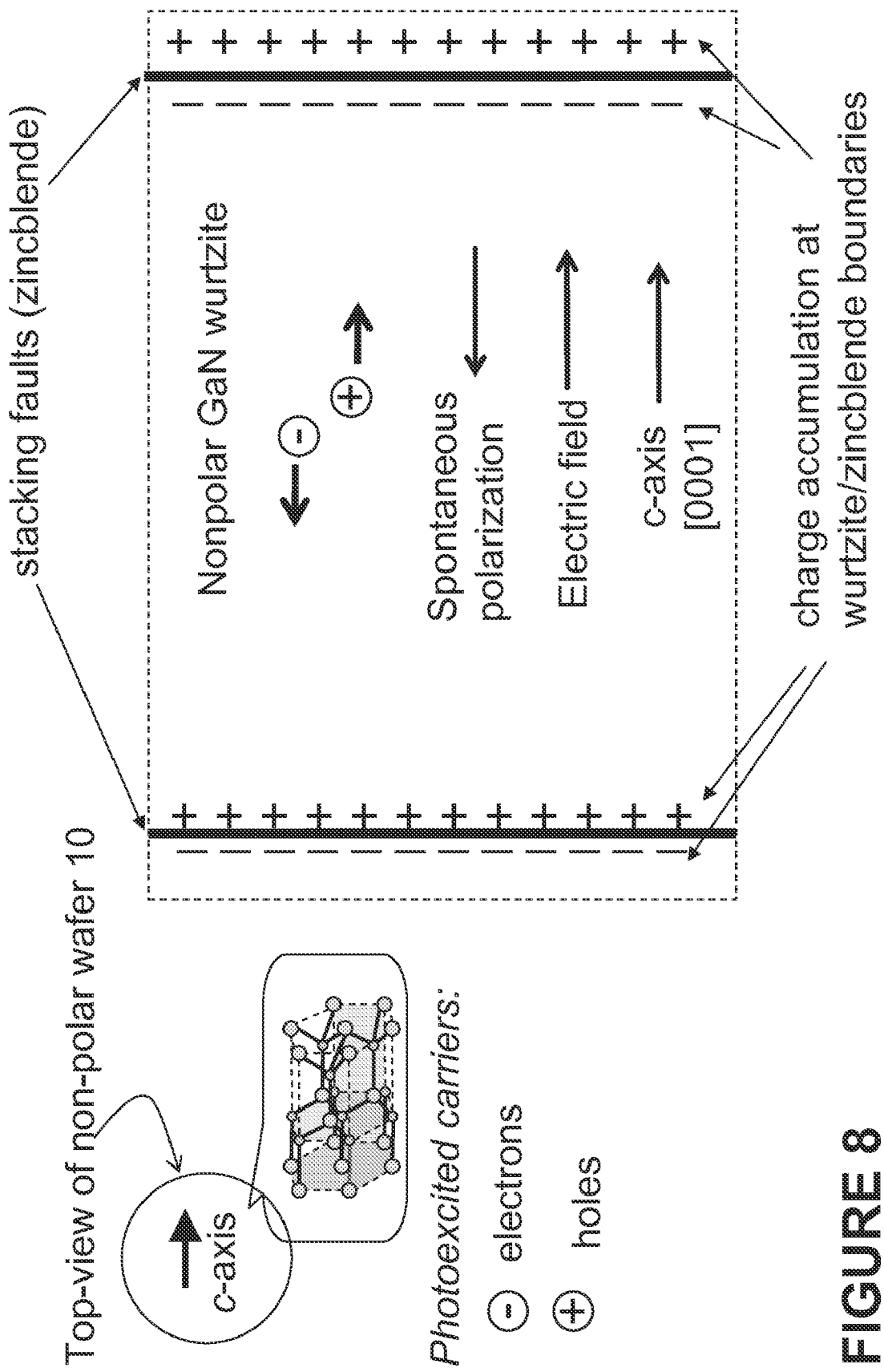
FIG. 8 is an illustration of stacking faults in nonpolar GaN illustrating the charge accumulation at the wurtzite/zinc blende boundaries.

In order to derive the THz electric field radiated, the time derivative of the net current, $$\frac{\partial J}{\partial t} = \sum q_i r_i$$

is calculated as a function of time. It acts as the source term in Maxwell's equations when determining the THz emission Majewski, et al., have performed calculations of zincblende inclusions embedded in bulk wurtzite GaN and concluded that charge buildup at the wurtzite/zincblende interfaces in GaN (as depicted in FIG. 8) results primarily from the spontaneous polarization $P_{sp}$ in wurtzite material, with a negligible contribution from the piezoelectric polarization. Majewski, et al., also concluded that the interface charge can be calculated from the bulk spontaneous polarization. Using the appropriate boundary conditions at the SF interface and Maxwell's equations, the SF-related electric field $F_w$ in the wurtzite region can then be expressed as $$F_w = \frac{P_{sp}}{\varepsilon_0}\left(\frac{1}{\varepsilon_w + \varepsilon_{zb}[d_{wz}/d_{zb}]}\right), \quad (2)$$

(where $P_{sp}$ is spontaneous polarization, $\epsilon_{wz}$ and $\epsilon_{zb}$ are the dielectric constants of the WZ or ZB regions, respectively, $d_{wz}$ and $d_{zb}$ represent the thickness of the WZ and ZB regions, respectively, and $\epsilon_o$ permittivity of free space), the contribution to the electric field of the THz radiation, $E_{THz}$, due to the stacking fault-related internal electric field, is proportional to the time derivative of the transient photocurrent J(t), which is proportional to the internal electric field in the WZ region, $F_{wz}$.

$d_{wz} \sim 1/n_{sf} = 100$ Å, where nsf is SF density=1×106 cm-1
$d_{zb} \sim 3/2\ c_{wz} \sim 8$ Å (for I1 type SF, and $c_{wz}$ is lattice constant)
As shown above, the thickness of the zincblende region (in this case, the $I_1$ type SF) is $d_{zb} \approx 3c_{wz}/2 = 8$ Å, where $c_{wz}$ is the lattice constant of wurtzite GaN, and the thickness of the wurtzite region is $d_{wz} \approx 1/n_{sf} = 100$ Å, where $n_{sf}$ is the SF density. For example, Majewski, et al, estimated that if $P_{sp} = -0.034$ C/m², the maximum average in-plane electric field in the wurtzite region of an m-GaN sample with an $I_1$ type SF density of 1×10⁶ cm⁻¹ was estimated as ~290 kV/cm (Unscreened average in-plane electric field in the wurtzite region). A more complete description is found at Majewski et. al, MRS Internet Journal of Nitride Semiconductor Research 3 (21) (1998) and J. A. Majewski, G. Zandler, and P. Vogl, Phys. Stat. Sol. A 179, 285 (2000).

Built-in electric fields due to a SF-terminated internal polarization have also observed in other materials such as SiC. For most optoelectronic applications, stacking fault defects and subsequent internal electric fields are undesirable as they reduce the quality of the material performance, and much research has been performed in an effort to decrease the number of stacking faults in semiconductors. However, in accordance with the principles of the present invention, the internal electric fields created by a stacking fault terminated in-plane polarization can function advantageously for terahertz (THz) applications.

Various compounds can be utilized to form the crystal structure, such as, for example, GaN, InN, AlN and alloys thereof, ZnO, MgO, ZnS, ZnSe, ZnTe, and alloys thereof, and SiC. Various crystal structure methods of formation may be used to create the crystal structure, including molecular beam epitaxy (MBE) and metalorganic chemical vapor deposition (MOCVD), which are known to those of ordinary skill in the art. As illustrated in FIG. 2A, for enhanced THz radiation, the c-axis is in the plane of incidence and pointed along the +y direction (the x-y plane is shown in the left corner of FIG. 2), and detection of the THz radiation is in the p-wave direction.

A substance which has a natural charge separation in the absence of a field is called a polar material. As used herein, the terminology polar, nonpolar, and semipolar relate to the orientations of the polar material. Specifically, FIGS. 3 and 4 are illustrations showing three different orientations (polar, nonpolar and semipolar) of the c-axis of a crystal's structure (with c-axis being defined as perpendicular to the c-plane) relative to the growth plane, which in these examples is the sample surface. In the polar orientation example shown in FIG. 3, the c-axis is perpendicular to the growth plane. In the nonpolar orientation example, the c-axis is parallel to the growth plane and perpendicular to the growth direction. A semipolar orientation is depicted in FIG. 4 in which the c-axis of the crystal structure has a projection onto the growth plane. As used herein the terminology "projection onto" refers to a mathematical construct in which a vector diagram can be used to evaluate the intensity of the component projected onto a given plane. As shown in FIG. 4, the projection of the c-axis onto the growth plane results in a vector component labeled as "projection of c-axis onto growth plane" in FIG. 4. As seen in FIG. 4, the intensity value associated with the projection is non-zero; but may be in the range of 30 to 100%. The orientation of the crystal structure is that represented by the insert in FIG. 4.

In a preferred embodiment of the present invention, a polar semiconductor is grown on a substrate such that growth proceeds in a non-polar direction, with the crystal's polar axis in-plane as shown in the bottom of FIG. 3. This non-polar orientation of the crystal structure therefore has a non-zero in-plane polarization that can be terminated by a stacking fault, which normally originates perpendicular to the polar axis. As depicted for example in FIG. 9, the stacking fault(s) is essentially an interruption in the normal stacking sequence of crystal planes, effectively resulting in a material of slightly smaller bandgap that acts similar to an in-plane, ultra-narrow, quantum well-like structure that creates an electric field through the termination of the in-plane electric polarization. In addition to non-polar oriented crystal structure configurations where there is a non-zero in-plane electric polarization, the principles of the invention may be utilized with structures in which there is a projection of the c-axis on the growth plane, which is referred to as semi-polar oriented material; a representation of which is shown in FIG. 4.

For very large stacking fault densities, the internal electric field is determined by the spontaneous polarization of the semiconductor material. However, as the distance d between the stacking faults becomes larger, the field across the wurtzite region decreases as F approx. Eg/qd), where Eg is the bandgap of the semiconductor and q is the electron charge. For typical stacking fault densities in the range of $10^3$/cm to $10^7$/cm the internal field can be as large as 1800 kV/cm in some materials without any material processing or the contact formation required in some prior art embodiments. When illuminated with a roughly 100 femtosecond pulse with photon energy greater than Eg, carrier transport perpendicular to the stacking faults will generate THz radiation with a preferred polarization.

The present invention enables the generation of broadband THz pulses with higher pulse energy than a conventional photoconductive switch embodiment because it can support higher electric fields. Tests were performed using a frequency tripled (266 nm) coherent regenerative amplifier (RegA) at 800 nm. The typical pulse width is approximately 150 fs with a pump power of approximately 3 mW. FIG. 2A is a schematic illustration showing the orientation of a sample 10 relative to the femtosecond laser excitation. As shown in FIG. 2A, the pump beam (20) is incident on the a-sample 10, for example GaN, at approximately 45 degrees to the surface normal.

Figure 5A:
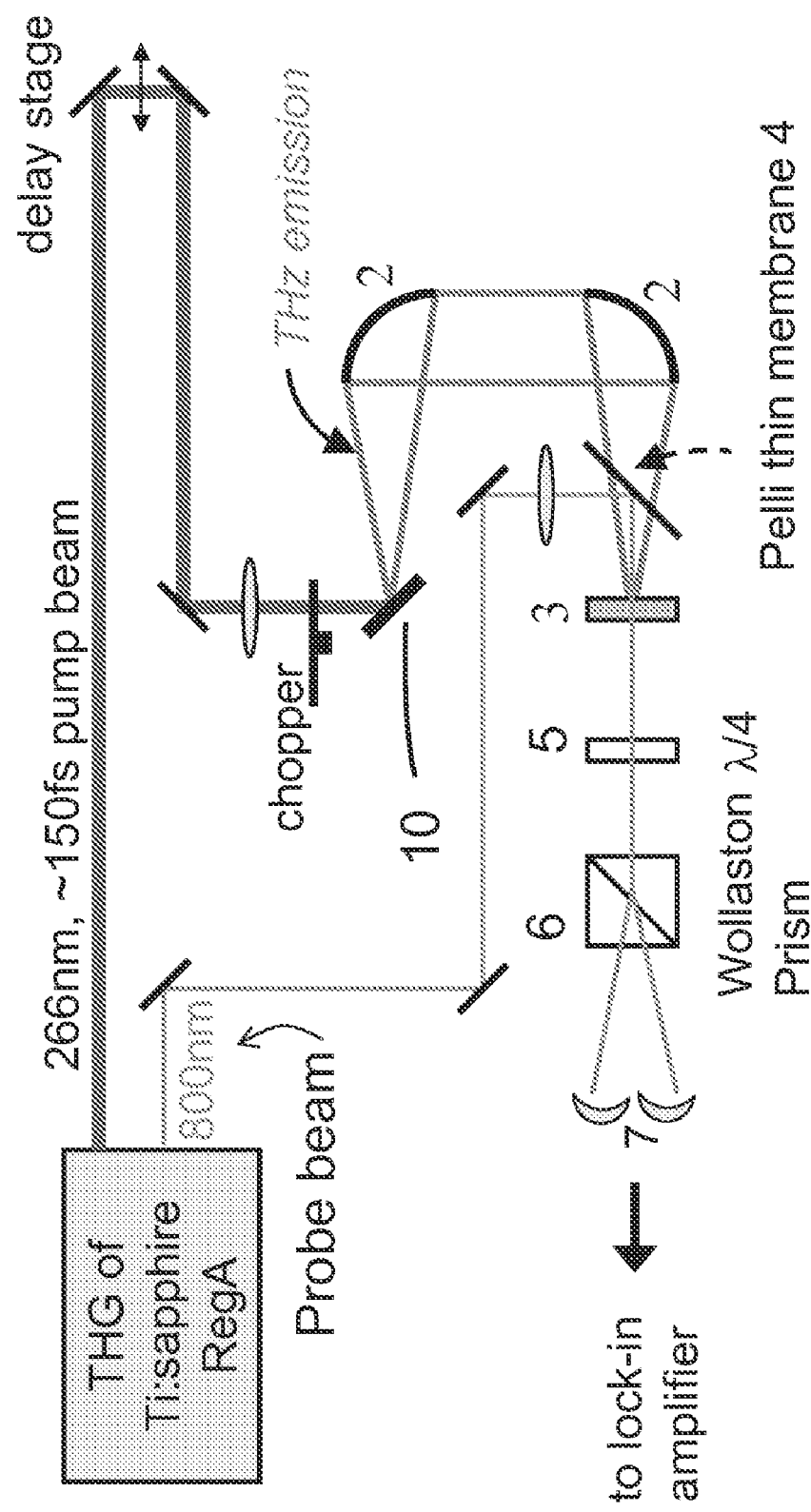
FIG. 5A is a schematic illustration of a preferred embodiment for producing and measuring terahertz emission from a crystal material 10.

FIG. 5A is a schematic illustration showing a GaN sample 10 in which the subsequent THz emission is collected with a pair of parabolic mirrors (2) on to a sensor 3 (which may for example an electro-optic crystal such as a ZnTe crystal) for electro-optic sampling, using part of the 800 nm beam as the probe. The terahertz detection may also be done using a photoconductive switch. In the configuration shown in FIG. 5, the polarization of the pump and probe beams are both in the plane of incidence. The plane of incidence is best understood by reference to FIG. 2A as the plane containing the laser propagated (incident) and THz propagated directional arrows. The configuration shown in FIG. 5A enables measurements via ultrafast optical excitation. A regenerative amplifier (RegA) system, which operates at 800 nm and has a repetition rate of 250 kHz, may be used as the ultrafast laser source 20. The output of the RegA is split into two beams. For infrared excitation pulses, the stronger beam is frequency doubled to serve as the pump source for an optical parametric amplifier (OPA), which generates an infrared idler pulse tunable from ~0.9-2.4 micrometers. The OPA also produces a visible signal beam tunable from ~480-720 nm. The signal beam at 700 nm is doubled for 350 nm excitation. For other ultraviolet pulses, the stronger RegA beam is frequency doubled (400 nm) or tripled (266 nm). The pump pulse, after compression with a prism pair to typical pulse widths of ~150 fs, is focused onto the semiconductor sample 10 at a 45° incidence angle with a beam diameter of ~1 mm. The pump power is ~4 mW for all excitation wavelengths. The weaker RegA split-off beam is used to probe the THz emission for all excitation wavelengths, as well as to irradiate the samples at 800 nm. The subsequent THz emission from the semiconductor surface is collected and focused with a pair of off-axis parabolic mirrors (2) onto a 2 mm-thick ZnTe crystal (3) for electro-optic (EO) sampling, which is based on the linear EO effect or Pockels effect and allows for coherent detection of freely propagating THz emission. The THz radiation incident on the EO crystal alters the birefringence of the crystal which results in a phase retardation of the probe beam through the EO crystal. Monitoring of the phase retardation of the probe beam is conducted with a balanced detector system.

The detection is a known electro optic sampling technique for detecting Terahertz emission. The configurations shown in FIGS. 5A, 5B and 5C use both a probe beam and a pump beam. Specifically, a reflector 4, which may be for example, a pellicle or thin membrane, reflects the probe beam and transmits terahertz radiation. The quarter wave plate 5 results in the linearly polarized incident probe beam becoming circularly polarized. The circularly polarized probe beam is then split by the Wollaston prism 6 which breaks up the vertically and horizontally polarized components of the probe beam spatially. The difference signal between the vertically and horizontally polarized components is detected using a balanced detector. When no terahertz emission is present, the balanced detector measures no signal. When terahertz emission is produced, the circularly polarized probe beam becomes elliptically polarized. For an elliptically polarized probe beam, one polarization component has a stronger amplitude and the balanced detector 7, indicates the difference between each; i.e., the detectors effectively breaks the beam into two orthogonal polarizations, and because the elliptically polarized probe light has two unequal components due to the Terahertz emission, the subtraction results in measurement of the Terahertz emission. For a more comprehensive explanation, reference is made to A. Nahata, et al., "Coherent Detection of Freely Propagating Terahertz Radiation by Electro-optic Sampling," Appl. Phys. Lett. 68 (2), 8 Jan. 1996, which is hereby incorporated by reference. Although all III-Nitride semiconductors can emit THz radiation, a preferred embodiment utilizes InN, which has applications in 1550 nm fiber-laser based systems.

Figure 5B:
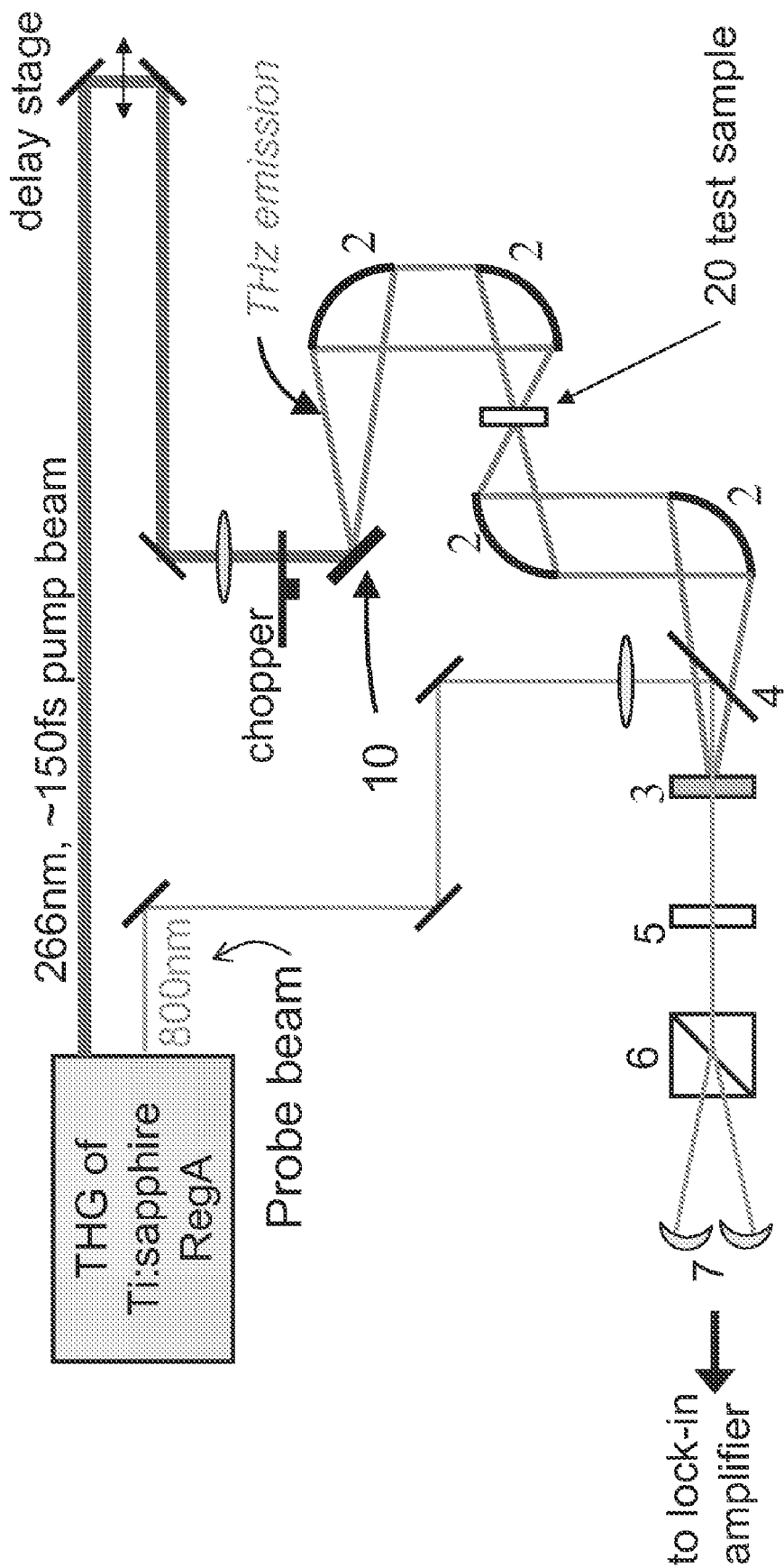
FIG. 5B is a schematic illustration of a preferred embodiment for producing and measuring terahertz emission from a crystal material 10 wherein detection is accomplished from measuring terahertz transmission transmitted through the test sample.
Figure 5C:
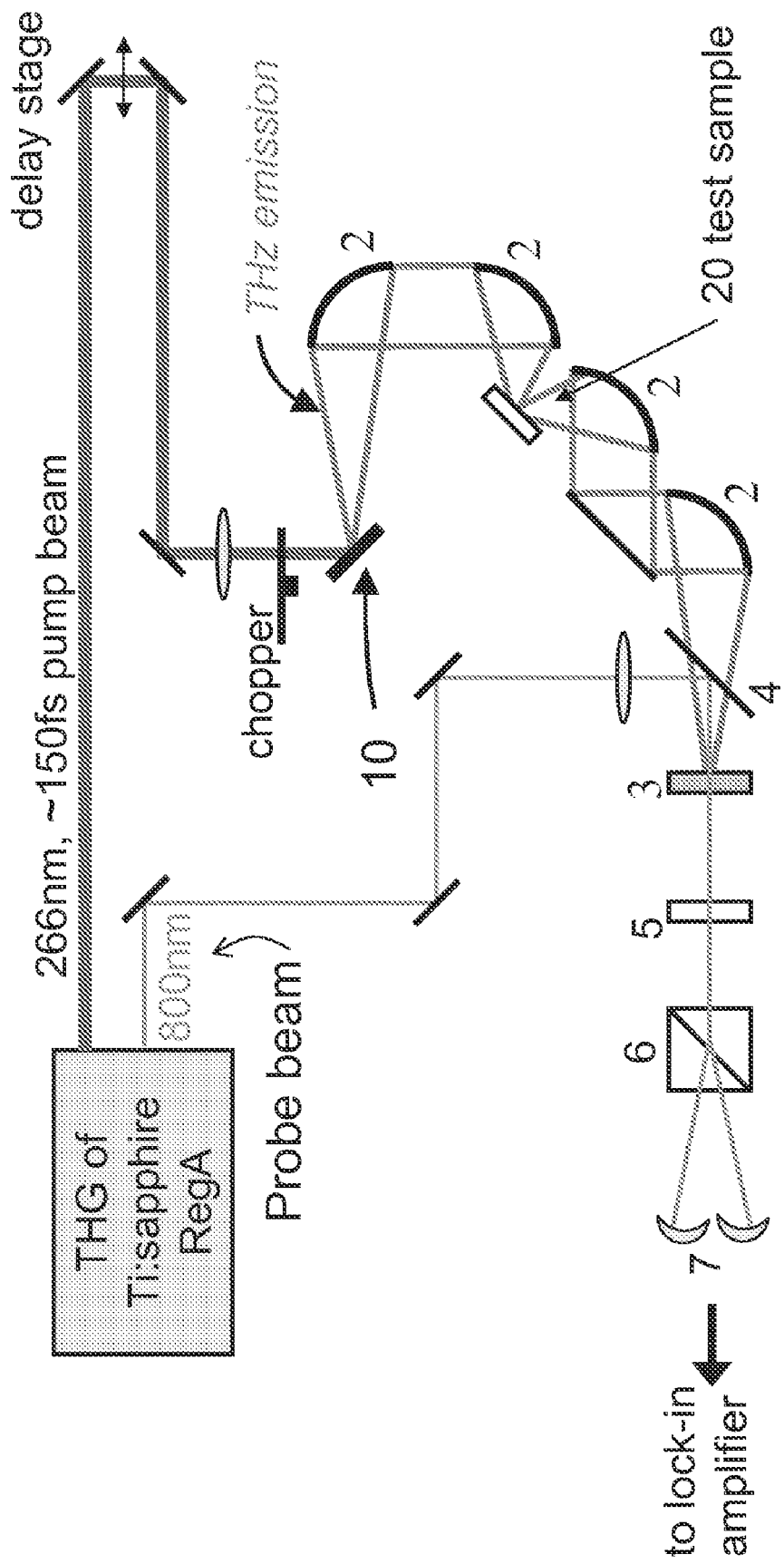
FIG. 5C is a schematic illustration of a preferred embodiment for producing and measuring terahertz emission from a crystal material 10 reflected from a test sample.

FIG. 5B is a configuration in which a test sample 20 is subjected to Terahertz radiation and the configuration measure transmission of THz through a test sample. The test sample 20 can be in a gas, liquid or solid phase. In FIGS. 5B and 5C, elements corresponding to those in FIG. 5A are numbered with corresponding numbers. THz emission is collected with four parabolic mirrors 2 onto an electro-optic crystal 3 (which may for example be a ZnTe crystal) for electro-optic sampling, using part of the 800 nm beam as the probe. The pellicle or thin membrane 4 reflects the probe beam while allowing the terahertz radiation to pass through. The polarization of the pump and probe beams are both in the plane of incidence. The plane of incidence is best understood by reference to FIG. 2 as the plane containing the laser propagated (incident) and THz propagated directional arrows. The quarter wave plate 5 is an optical device that alters the polarization state of a light wave travelling through it by shifting the phase between two perpendicular polarization components of the light wave. The quarter-wave plate 5 creates a quarter-wavelength phase shift that changes linearly polarized light to circular. When the Terahertz radiation is absent, the circularly polarized light from the probe beam has two substantially identical intensity components which are separated by the Wollaston prism into two orthogonal, linearly polarized outgoing beams. Two photodetectors measure the two outgoing beams from the Wollaston prism and output the difference. When terahertz radiation is present, the probe beam becomes elliptically polarized and results in a difference being detected by detectors 7.

Figure 5D:
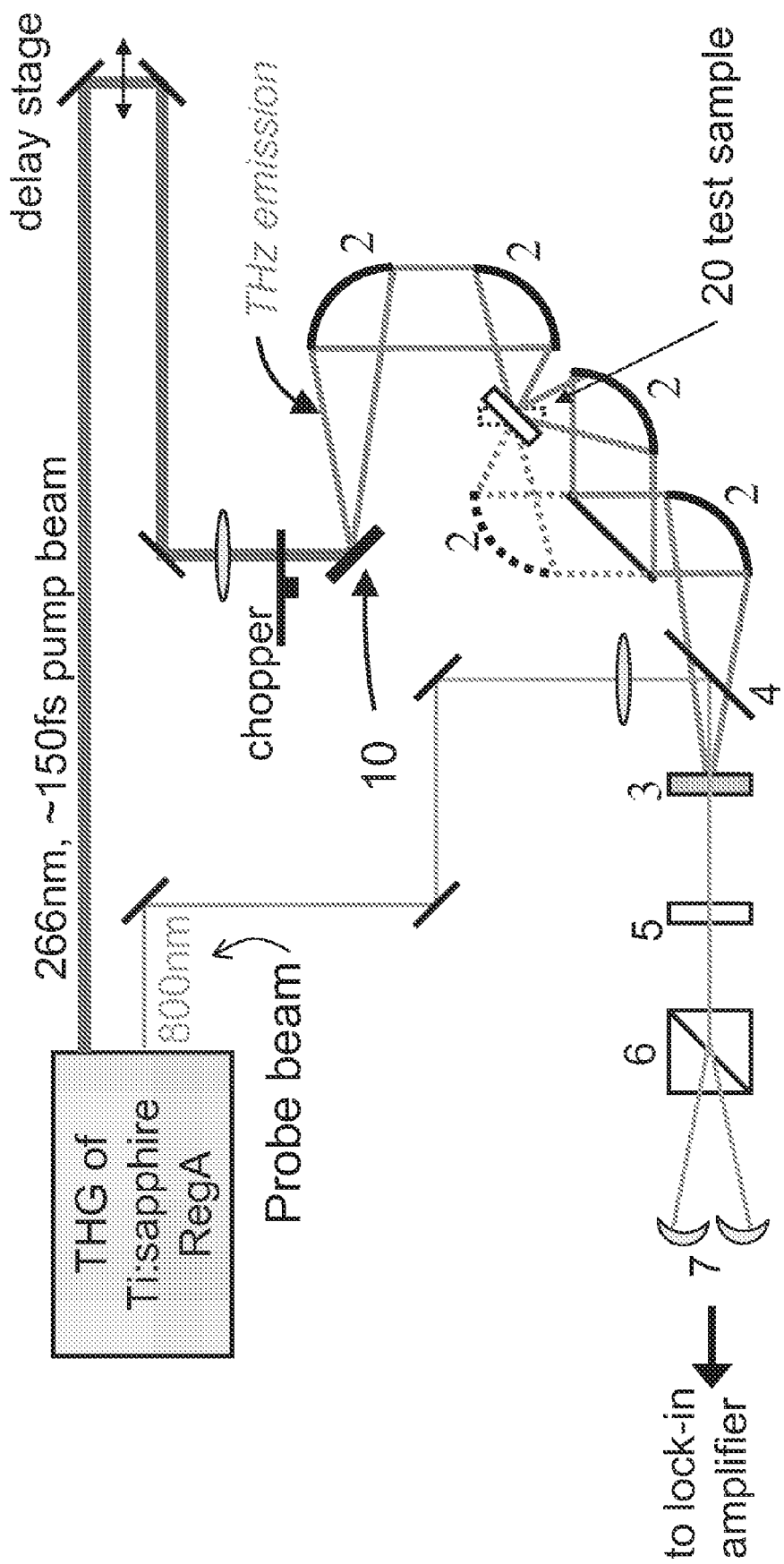
FIG. 5D is a schematic illustration of a preferred embodiment for producing and measuring terahertz emission from a crystal material 10 both reflected from and transmitted through a test sample.

FIG. 5C is a configuration which measures reflection of THz from a test sample 20. The test sample 20 can be in a gas, liquid or solid phase. The configurations described with respect to FIGS. 5A, 5B and 5C are merely exemplary and the scope of the invention is not limited to these particular embodiments. Moreover, the components of FIGS. 5A, 5B and 5C are illustrated as separated elements; however, one of ordinary skill in the art would appreciate that in practice the components of FIGS. 5A, 5B and 5C, with the exception of the test sample 20, would be assembled together to form an integral assembly. Each of the FIGS. 5A, 5B and 5C could form a separate embodiment. Alternatively, the components could be arranged to permit modification to accommodate the entry and analysis of the test samples 20. For example, a single assembly may be a composite of FIGS. 5B and 5C and, depending upon whether the test sample 20 will reflect or transmit terahertz radiation, the parabolic mirrors 2 and receiving elements 3, 4, 5, 6 and 7 of FIGS. 5B and 5C could be adjusted or relocated to accommodate the transmitted or reflected THz radiation. For example, the elements 3, 4, 5, 6 and 7 could be integrally mounted and the mirrors 2 could be adjustable to accommodate either transmitted or reflected terahertz radiation. Alternatively, two separate paths could be achieved by superimposing the two images of FIGS. 5B and 5C to create an apparatus as shown in FIG. 5D.

FIG. 6 is an illustration of the wurtzite structure observed in, inter alia, III-V nitride semiconductors, characterized by a highly polar material that can support a significant spontaneous polarization along the c or [0001] axis. Internal polarization is further enhanced in strained nitrides due to the piezoelectric effect. Terahertz emission using the principles of the present invention is dependent in part upon the orientation of the crystal lattice structure within the various samples 10, which in turn is defined relative to the c-plane or c-axis, a-plane and m-plane, all of which are represented in FIG. 6. For c-plane or (0001)-oriented wurtzite the growth is along the c-axis; and the c-axis is perpendicular to the growth plane. Non-(0001) orientated wurtzite occurs when the growth is not along the c-axis and the c-axis is not perpendicular to the growth plane; such as for example, m-plane (1$\bar{1}$00) wurtzite orientation.

FIG. 7 is a depiction of stacking faults (SFs) in the wurtzite structure of nonpolar (c-axis parallel to growth plane) nitride semiconductors; which terminate the internal polarization and create a charge accumulation at the SF interfaces. As recognized by those of ordinary skill in the art, wurtzite and zinc blende are crystal formations. Due to its lower energy state, wurtzite is the predominate crystal structure in nitride semiconductors. In general, if a hexagonal closest-packed structure is adapted, the crystal is Wurtzite. If cubic closest-packed structure is adapted, the crystal is Zinc Blende. A stacking fault, as the term is used herein, comprises any derivation from the predominate crystal structure (or sequential stacking pattern). For the wurtzite crystal structure comprising repeating layers of AB; any derivation from this order as well as any change in A or B is a stacking fault. Wurtzite crystal structure can also comprise of repeating layers of BC. Zinc blende crystal structure comprising repeating layers of ABC. Depicted in FIG. 7 is a stacking fault in GaN. It is noted that wurtzite GaN has a lower energy state than zinc blende GaN, but zinc blende GaN inclusions are created by utilizing lattice mismatched substrates which disrupt crystal formation and create discontinuities. For example, Gallium Nitride (GaN), grown on sapphire, automatically generates structural defects. Sapphire refers to gem varieties of the mineral corundum, an aluminum oxide ($\alpha$-$Al_2O_3$), when it is a color other than red. One of ordinary skill in the art would recognize that stacking faults may be created by using two materials with very different lattice parameters and growing one on top of the other. Lattice relaxation will lead to structural defects; many of which will be stacking faults. In accordance with a preferred embodiment of the present invention, the material needs to grow in an orientation in which there is a projection of the c-axis in growth plane. For example, in the case of Indium Nitride grown on top of Gallium Nitride, the Gallium Nitride base has a c-axis in the growth plane and the Indium Nitride on top has a c-axis is in growth plane. In general, prior art Terahertz producing crystals utilized materials with a c-axis perpendicular to the growth plane.

Figure 9:
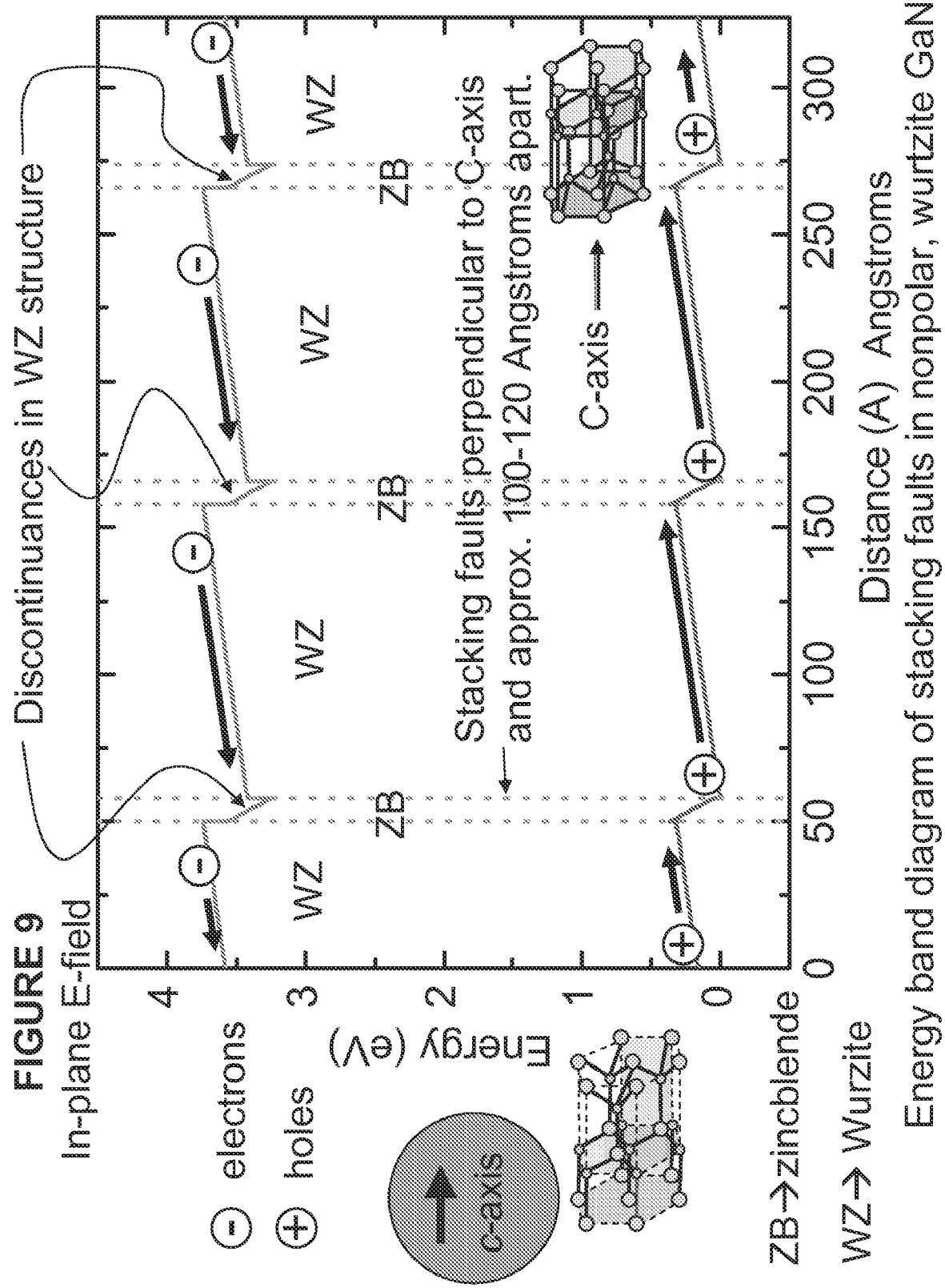
FIG. 9 is an energy band diagram of stacking faults in nonpolar, wurtzite GaN.

FIG. 8 is an illustration of the electric fields due to stacking faults in nonpolar (c-axis is parallel to growth plane) wurtzite GaN. As seen in FIGS. 7-9, the discontinuity between the GaN wurtzite structure (AB or BC) and the GaN zinc blende structure or domain (ABC), results in a stacking fault. Stacking faults may be intentionally created during the formation of the crystal; primarily from the large density of structural defects associated with heteroepitaxial growth on lattice-mismatched substrates.

FIG. 9 is a schematic depiction of the band energy diagram of the wurtzite structure and the discontinuances in the wurtzite structure caused by zincblende (ZB) structural formations. As depicted in FIG. 9, the stacking faults may be in the range of 100-120 Angstroms apart.

FIG. 10 is a depiction of quantum well configurations shown in relationship to the stacking faults. As illustrated in FIG. 10, internal electric fields are created due to the termination of the internal polarization at the interfaces between materials, such as between InGaN and InN.

Figure 11A:
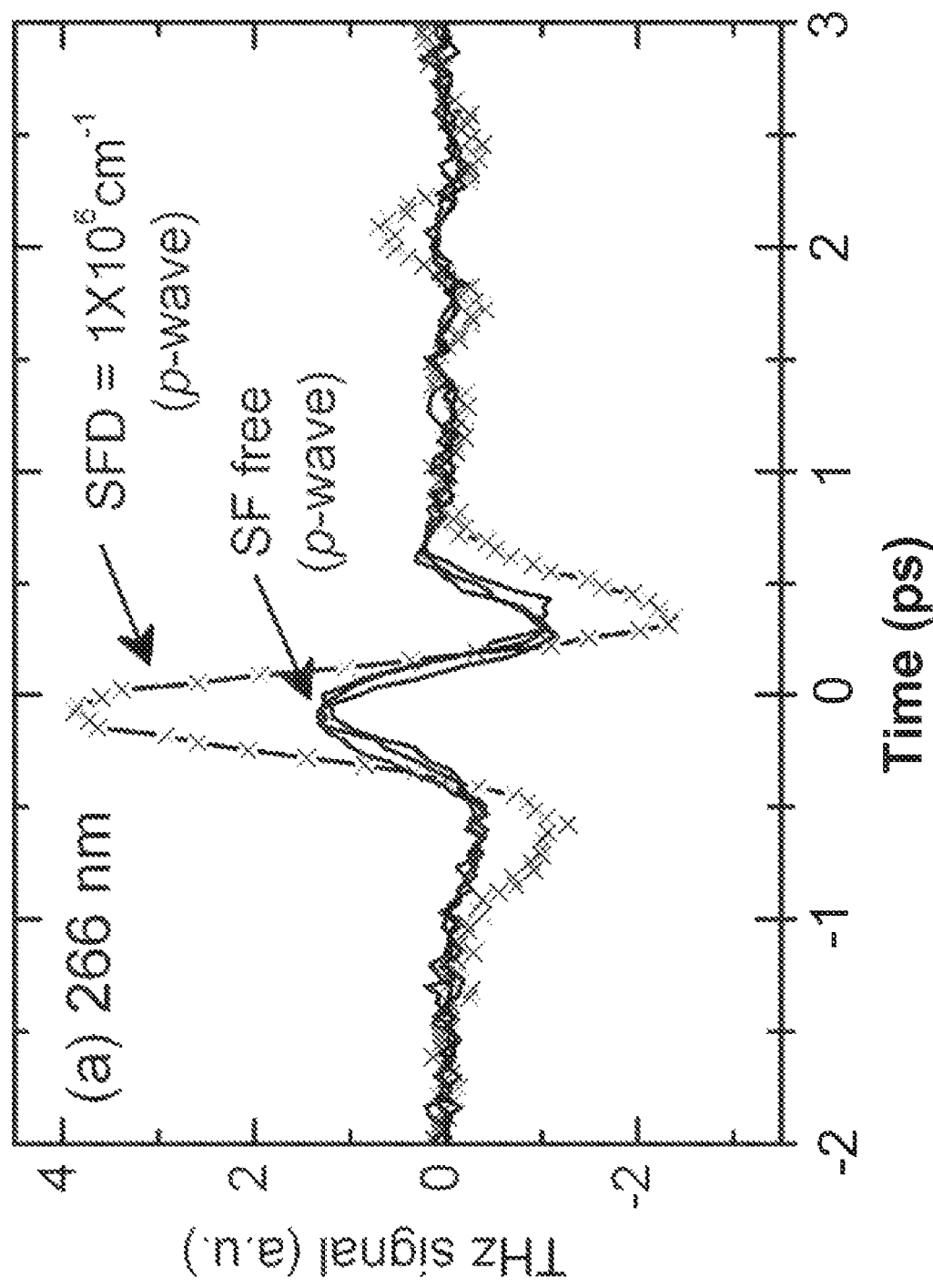
FIGS. 11A and 11B are graphical illustrations of time-resolved p-wave terahertz signal amplitude showing enhanced terahertz emission from a high stacking fault density (SFD) m-plane GaN sample relative to a SF-free m-plane GaN sample, especially for longer excitation wavelength.
Figure 11B:
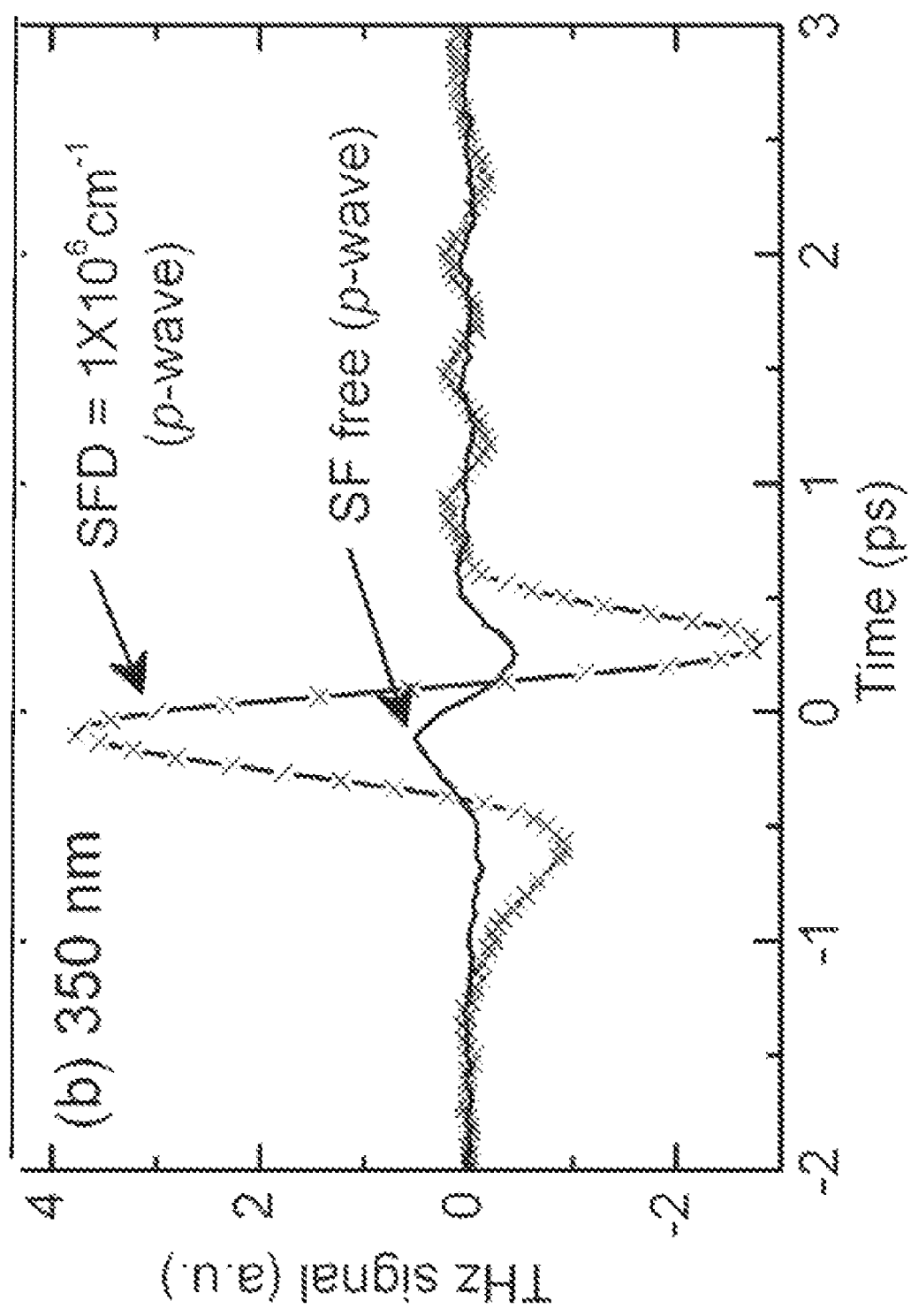

FIGS. 11A and 11B are graphical illustrations of enhanced Terahertz emission from a "stacking fault" sample relative to a stacking fault-free sample, especially for longer excitation wavelengths, due to in-plane E-field from Stacking Fault (SF) terminated internal polarization. FIGS. 11A and 11B show time-resolved polarized THz signal from stacking fault free m-plane GaN and the high-stacking-fault-density m-plane GaN (m-plane (1$\bar{1}$00)) epilayer with a SF density of $1 \times 10^6$ cm$^{-1}$) at a sample rotation angle of 180°, under (a) 266 nm and (b) 350 nm excitation. FIG. 11A shows Terahertz emission from the SF-free m-plane GaN sample at sample rotation angles ranging from 0 degrees to 360 degrees.

The THz emission from the m-plane GaN material was compared with that from an approximately 330 μm-thick SF-free m-plane GaN substrate. The samples were optically excited using the third harmonic (226 nm) of a Coherent regenerative amplifier (RegA) at 800 nm with a repetition rate of 250 kHz and typical pulse width of approximately 150 fs. The pump beam was incident on the GaN sample at 45 degrees to the surface normal. The subsequent THz emission was collected with a pair of parabolic mirrors onto a ZnTe crystal for electro-optic sampling (as schematically illustrated in FIG. 5A). The ZnTe-based THz electro-optic detection system is polarization sensitive, enabling analysis of the polarization of the THz radiation.

Figure 12A:
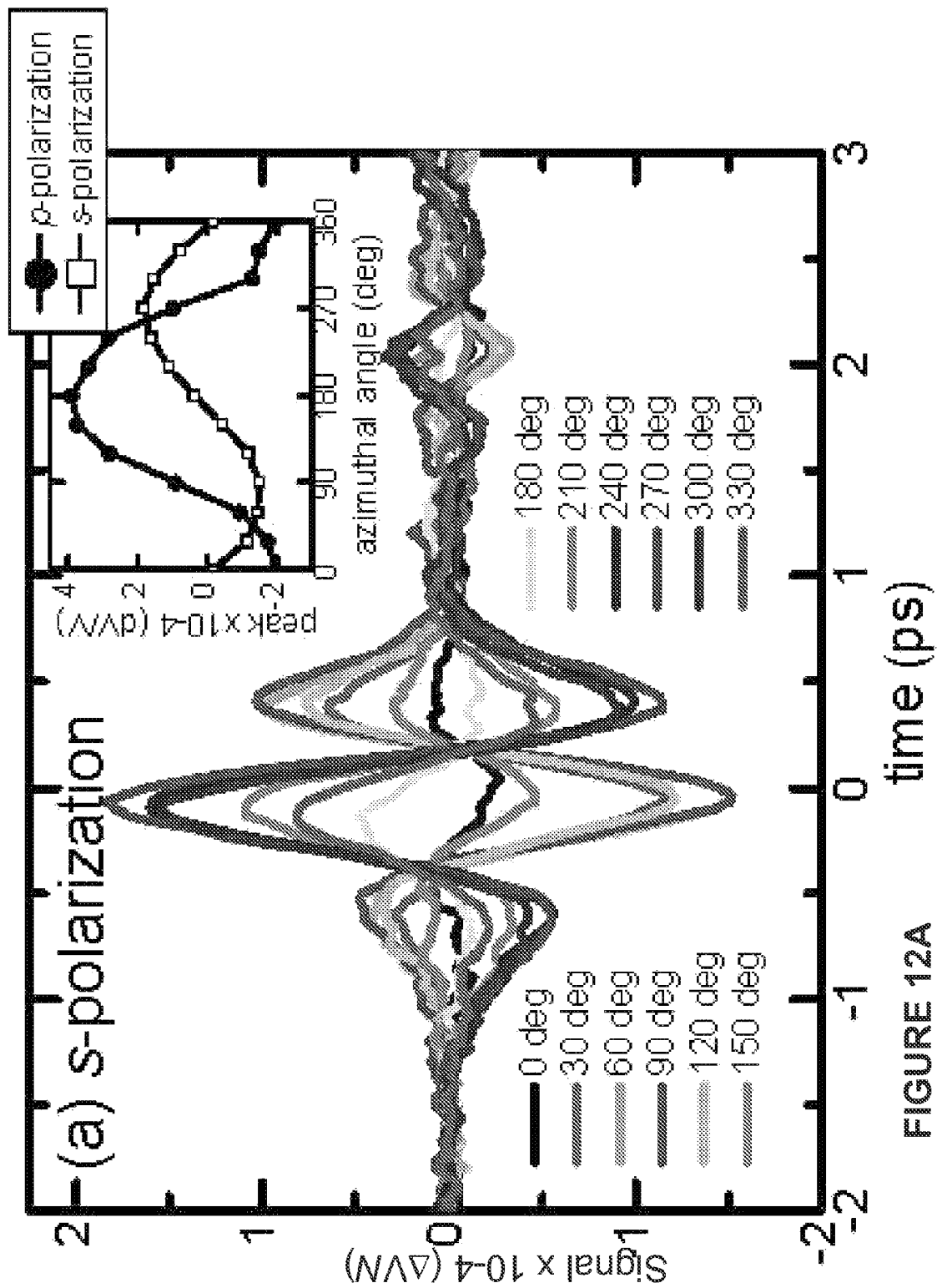
FIG. 12A graphically illustrates time-resolved s-wave terahertz signal from a m-plane GaN sample at various sample rotation angles. The m-plane GaN sample has a stacking fault density of $10^6$ cm$^{-1}$ and is excited with femtosecond laser pulses at 266 nm.
Figure 12B:
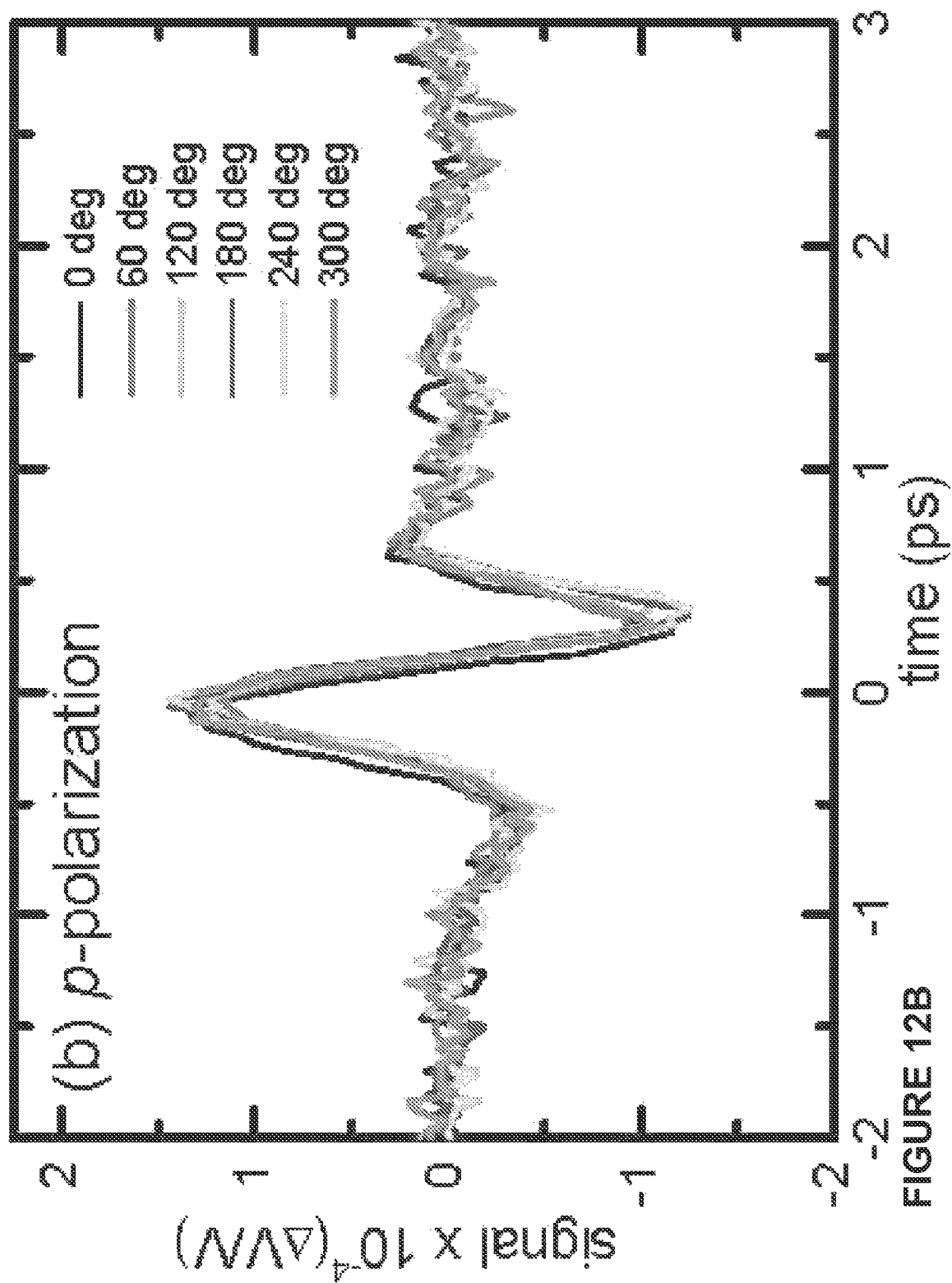
FIG. 12B is a graphical illustration of p-wave terahertz signal amplitude from a SF-free m-plane GaN sample at sample rotation angles ranging from 0 degrees to 360 degrees. The sample is optically excited by femtosecond laser pulses at 266 nm. For the SF-free sample, there is no sample rotation dependence of the terahertz emission and no s-wave terahertz radiation is detected. The signal from the SF-free sample is due to surface normal photocurrents. The insert in FIG. 12A shows the sinusoidal dependence of the peak terahertz signal from the SF sample on sample azimuthal angle, consistent with terahertz emission due to in-plane electric fields. Note the 90 degree shift between the p-polarization and s-polarization curves.
Figure 13:
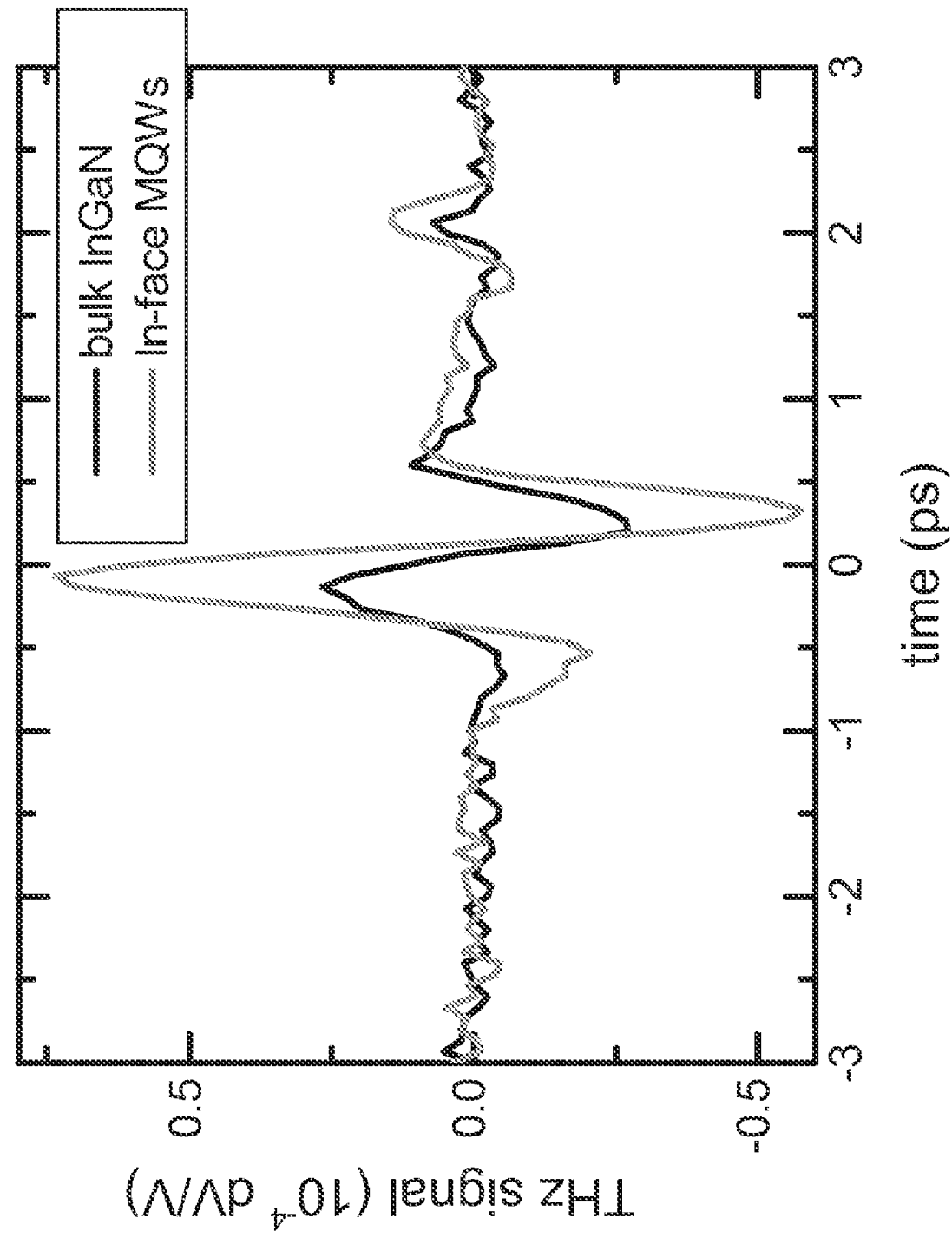
FIG. 13 is a graphical illustration depicting time resolved terahertz signal intensity.

FIG. 12A illustrates a time-resolved s-polarized THz signal form the high stacking fault-density m-plane GaN epilayer at different sample or azimuthal rotation angles Ø of the sample. The terms p- and s-polarization (or p- and s-wave) refer to the polarization of the THz signal which is parallel and perpendicular to the plane of incidence, respectively. At Ø=0 degrees, the c-axis was in the plane of incidence. As the sample was rotated, the measured s-polarized THz signal polarity flips, reaching its minimum value at Ø=90 degrees and its maximum value at Ø=270 degrees. The inset in FIG. 12A displays the sinusoidal dependence of the peak p- and s-polarized THz signal from the high SF density m-plane GaN substrate. FIG. 12B shows the THz signal from the SF-free m-plane GaN at sample rotation angles ranging from 0 degrees to 360 degrees which exhibits virtually no dependence on sample rotation. No s-wave component is observed from the stacking fault-free m-plane GaN material illustrated in FIG. 12B.

Figure 18:
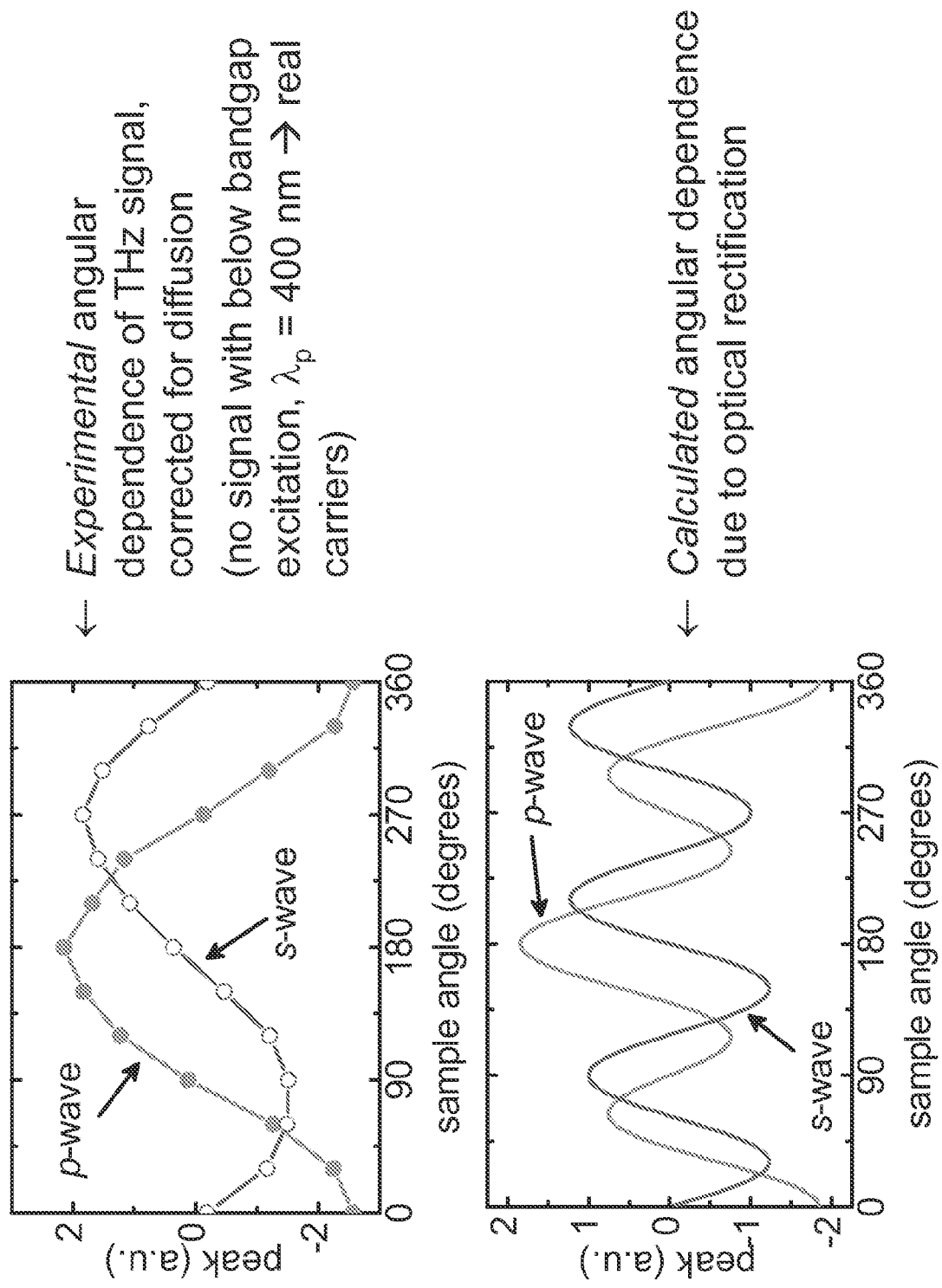
FIG. 18 is a graphical illustration depicting the experimental sample rotation dependence of the THz signal amplitude in comparison to the calculated sample rotation angle dependence due to optical rectification.

The sample rotation angle-dependent THz signal from the high SF density m-plane GaN epilayer revealed that the in-plane polarization of the wurtzite crystalline structure is terminated by stacking faults, which introduce thin zincblende domains at which charge accumulation leading to strong electric fields parallel to the c-axis of the crystal occurs, as shown in FIG. 8. In-plane transport of photoexcited carriers proceeds parallel to the electric field, leading to the THz radiation polarized preferentially along this axis of the sample. This mechanism provided the 360 degree oscillatory component of the THz amplitude as a function of sample angle. Rotating the c-axis by 180 degrees also rotates the direction of the built-in field by 180 degrees and causes the photoexcited carriers to accelerate in the opposite direction. A reversal of the photoexcited carrier acceleration direction is observed as a flip in the THz waveform polarity, as seen in the THz signal from the high SF density m-plane GaN depicted in FIG. 12A. The sin Ø dependence of and 90° shift between the p- and s-polarization curves (inset in FIG. 12A) indicates that the linearly polarized THz emission associated with in-plane carrier transport rotates with sample rotation. No optical rectification is observed; evidence of nonlinear polarization would appear as a sin(nθ) (where n>1) dependence of the THz signal, as shown in the calculated THz signal due to optical rectification displayed in the lower graph in FIG. 18. Moreover, no dependence on pump polarization is found after accounting for absorption, and the THz signal vanishes for 400 nm excitation, indicating that the signal is associated with the generation and transport of real carriers.

In the inset of FIG. 12A, the p-polarized curve is corrected for the surface normal transport contribution.

The offset which appears as a phase and amplitude asymmetry observed for the p-polarized THz waveforms from the high-SF-density m-plane GaN sample (FIG. 14B) emanates from the vertical, diffusion-driven transport, which does not depend upon sample rotation, and is also responsible for the angle independent p-polarization signal found for the SF-free sample (FIG. 12B).

Terahertz emission from high stacking fault density m-plane GaN is achieved using ultrafast pulse excitation. As observed in the inset of FIG. 12A, the terahertz signal exhibits a substantially 360° periodicity with sample rotation and a polarity flip when the c-axis is rotated by 180°, characteristic of real carrier transport in an in-plane electric field parallel to the taxis induced by stacking fault-terminated internal polarization at wurtzite domain boundaries. The terahertz emission conducted according to the principles of the present invention potentially may be enhanced by several times relative to that from a stacking fault-free m-plane GaN sample, for which the terahertz signal emanates from surface surge-currents and diffusion-driven carrier transport normal to the surface and is independent of the taxis orientation.

Evidence of internal electric fields induced by stacking fault (SF)-terminated internal polarization in polar crystals has been observed in ZnS, ZnTe, and SiC and predicted in GaN. In semipolar or nonpolar wurtzite crystals, for which there is a projection of the c-axis in-plane, the stacking fault induced electric fields associated with the termination of the internal polarization along the polar [0001] direction at wurtzite domain boundaries also lay in-plane. The high fields within the wurtzite domains terminated by the stacking faults substantially point in the same direction, effectively creating an array of contactless PC switches that could significantly enhance THz emission from semiconductor surfaces under ultra short pulse excitation.

In accordance with the present invention, enhanced THz emission induced by femtosecond ultraviolet pulses can be obtained from high stacking fault density nonpolar GaN. This is attributed to the THz radiation from an m-plane (1$\bar{1}$00) GaN epilayer with a SF density of $1 \times 10^6$ cm$^{-1}$ to the drift of photoexcited carriers in strong built-in electric fields created by SF-terminated internal polarization at wurtzite domain boundaries. The THz signal exhibits a 360° periodicity with sample rotation and a polarity flip when the c-axis is rotated by 180°, characteristic of real carrier transport in an in-plane electric field parallel to the c-axis, which is not observed in the emission from a SF-free m-plane GaN substrate, in which THz emission is governed by carrier diffusion or surface surge-currents normal to the surface. Comparison of the THz emission from the stacking fault and stacking fault-free samples indicated that the component attributed to in-plane transport dominates that from surface normal transport, even for high excess electron energies and short absorption lengths favorable to diffusive transport.

Figure 17:
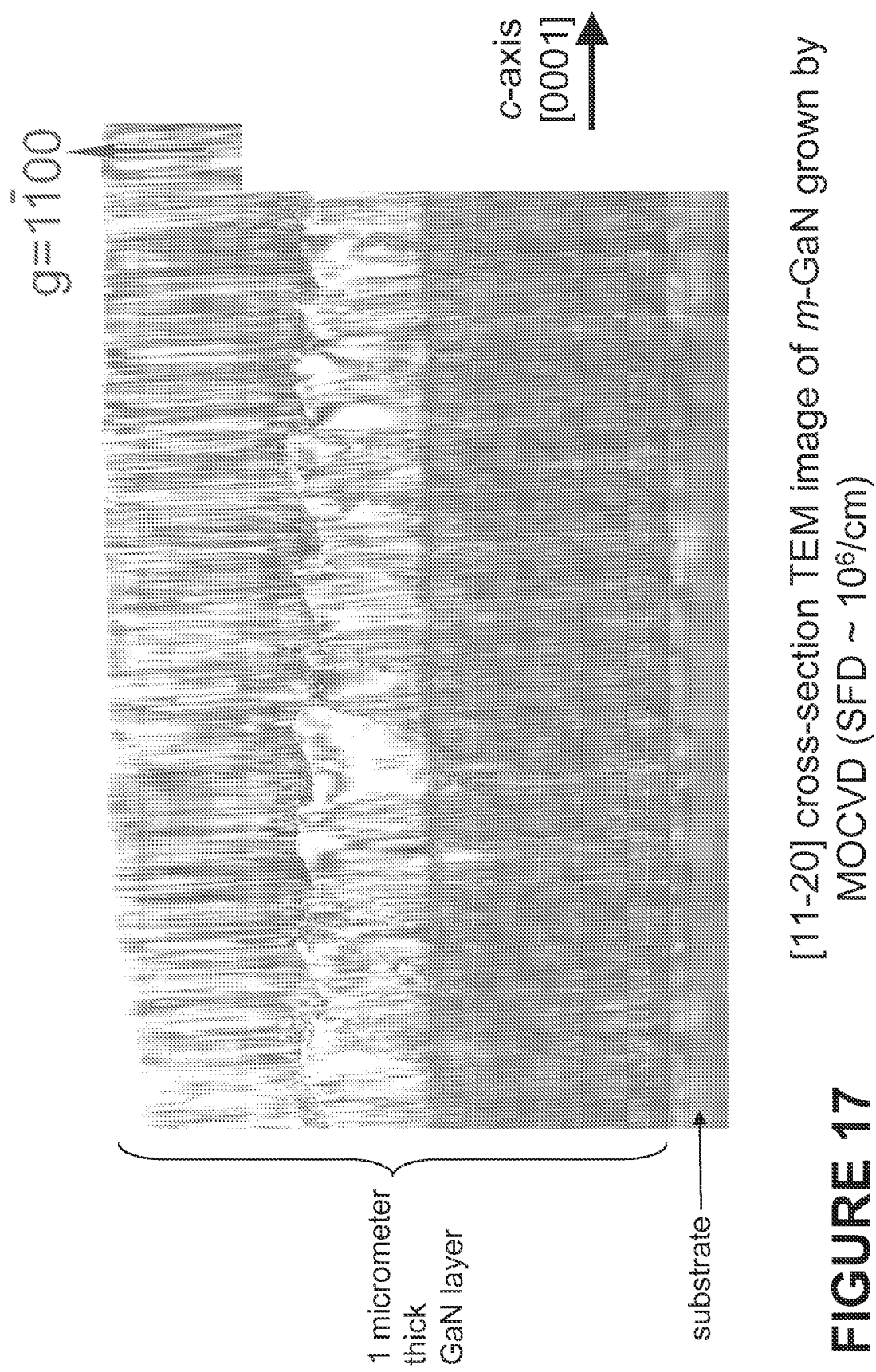
FIG. 17 is a transmission electron microscopy image of the high stacking fault density m-plane GaN sample showing the [11$\bar{2}$0] cross-section recorded in a g=1$\bar{1}$00 two-beam condition. Stacking faults appear as dark vertical lines across the sample.

Shown in FIG. 17 is an approximately 1 μm-thick high stacking fault-density m-plane GaN epilayer which was grown by metalorganic chemical vapor deposition (MOCVD) on an m-plane 6H—SiC substrate with an AlN nucleation layer. FIG. 17 shows the cross-sectional transmission electron microscopy (TEM) image of the film in which basal plane stacking faults (BPSFs) are visible as dark lines running perpendicular to the c-axis ([0001] direction). In studies conducted, it was determined that by scattering contrast TEM imaging that the majority of the stacking faults in this film are $I_1$ type, which corresponds to a stacking sequence of the (0001) basal planes of . . . ABABABCBCBCB . . . as shown in FIG. 7. The stacking faults result primarily from the large density of structural defects associated with heteroepitaxial growth on lattice-mismatched substrates.

For comparison purposes, the stacking fault free m-GaN is a ~330 μm-thick substrate from Mitsubishi Chemical Co., Ltd.® The samples were optically excited using ~150 fs pulses obtained from the third harmonic (266 nm) and second harmonic (400 nm) of a 250 kHz Coherent regenerative amplifier (RegA) at 800 nm, as well as from the frequency doubled signal beam (350 nm) of an optical parametric amplifier pumped by the RegA. The pump beam was incident on the GaN sample at approximately 45° to the surface normal (as depicted in FIG. 2), and the subsequent THz emission is collected with a pair of parabolic mirrors for polarization sensitive ZnTe-based electro-optic sampling, as illustrated in, inter alia, FIG. 5A.

FIGS. 14A and 14B show the time-resolved (a) s- and (b) p-polarized THz signal from the high SF-density m-plane GaN epilayer at different sample rotation angles for 266 nm excitation. The terms p- and s-polarization refer to the polarization of the THz signal parallel and perpendicular to the plane of incidence, respectively. At Ø=0°, the c-axis of the nonpolar sample is in the plane of incidence. As displayed in FIGS. 14A (14B), the measured s-polarized (p-polarized) THz waveform polarity flips as the sample rotates, reaching a peak positive signal at Ø=270° (180°) and a peak negative signal at Ø=90° (0°) when the taxis is parallel or antiparallel to the s-polarization (p-polarization) detection direction, respectively. Note that the peak positive signal (Ø=180°) of the p-polarized THz signal (FIG. 14B) is larger than the peak negative signal (Ø=0°), and the phase appears to shift as the sample rotates. In contrast, the p-polarized THz waveform from the SF-free m-plane GaN shown in FIG. 12B has no dependence on sample rotation angle, and no s-wave component is observed from this sample. The angle independent p-polarization from the stacking fault free material emanates from similar surface normal photocurrents found in c-plane InN and InAs which does not depend upon sample rotation. Although this signal is expected to be large due to the high excess electron energy (~1 eV) and small absorption depth (<50 nm) for 266 excitation, the THz emission from high stacking fault density sample is enhanced by nearly a factor of 3 (FIG. 11A) due to the component associated with in-plane transport. This enhancement factor increases to ~7 for 350 nm excitation (FIG. 11B) as the component of the THz emission emanating form the in-plane transport remains robust, while the signal associated with the diffusion component of surface normal currents becomes smaller, as expected for the lower excess electron energy (<100 meV) and increased absorption depth (~100 nm).

Surface normal transport is also responsible for the phase shift and amplitude symmetry among the p-polarized THz waveforms from the high stacking fault density m-plane GaN sample (FIG. 14B). To analyze only the in-plane transport, the normal photocurrent component can be separated from the in-plane drift component by rotating the c-axis of the crystal perpendicular to the p-polarization detection direction (FIG. 23). In this orientation, the in-plane drift contribution is not detected, and only the surface normal transport signal is measured. The p-polarized THz waveforms from the high SF-density m-plane GaN at various sample rotation angles can then be corrected for the surface normal transport contribution, which is independent of the c-axis orientation, to extract only the in-plane drift component. FIG. 23 displays the p-polarized THz waveform at Ø=0° with and without removing the surface normal transport component, which has a slightly different phase than the in-plane drift contribution. After removing the normal photocurrent contribution, the phase shift and amplitude asymmetry between the peak positive and peak negative p-polarized THz signals (FIG. 14B) noted above are eliminated and the corrected p-polarized THz waveforms (FIG. 23) resemble the s-polarized THz waveforms in FIG. 14A. Based on the analysis of the amplitude asymmetry in FIG. 14B and the orientation of the c-axis, one can also determine that the electrons accelerate in the [000$\bar{1}$] direction, consistent with carrier transport in built-in, in-plane electric fields created by SF-terminated internal polarization at wurtzite domain boundaries.

In accordance a preferred embodiment of the present invention, the in-plane polarization of the wurtzite crystalline structure is terminated by stacking faults, creating an interface and charge accumulation leading to the occurrence of strong electric fields parallel to the c-axis of the crystal. In-plane transport of photoexcited carriers proceeds parallel to the electric field, leading to a THz radiation component polarized preferentially along this axis of the sample. Rotating the c-axis by 180° also rotates the direction of the built-in field by 180°, causing the photoexcited carriers to accelerate in the opposite direction. A reversal of the photoexcited carrier acceleration direction is observed as a flip in the THz waveform polarity, as seen in the THz signal from the high SF density m-plane GaN in FIGS. 12A, 14A, and 14B.

In summary, the present invention provides enhanced THz emission from nonpolar GaN due to carrier transport in internal in-plane electric fields created by the termination of the in-plane polarization in wurtzite domains at zincblende SFs. The estimated, maximum average in-plane electric field of ~290 kV/cm in the wurtzite regions for an $I_1$ type SF density of $1 \times 10^6$ cm$^{-1}$ is comparable to the bias fields applied to PC switches using low-temperature grown GaAs, one of the best PC materials, but does not require electrode processing or an external bias. Comparison with THz emission from SF-free m-plane GaN indicates that the THz signal from SF-related in-plane carrier transport dominates that usually observed from carrier diffusion or surface surge-currents normal to the sample surface, even for high excess electron energies and short absorption lengths favorable to diffusive transport.

Figure 19:
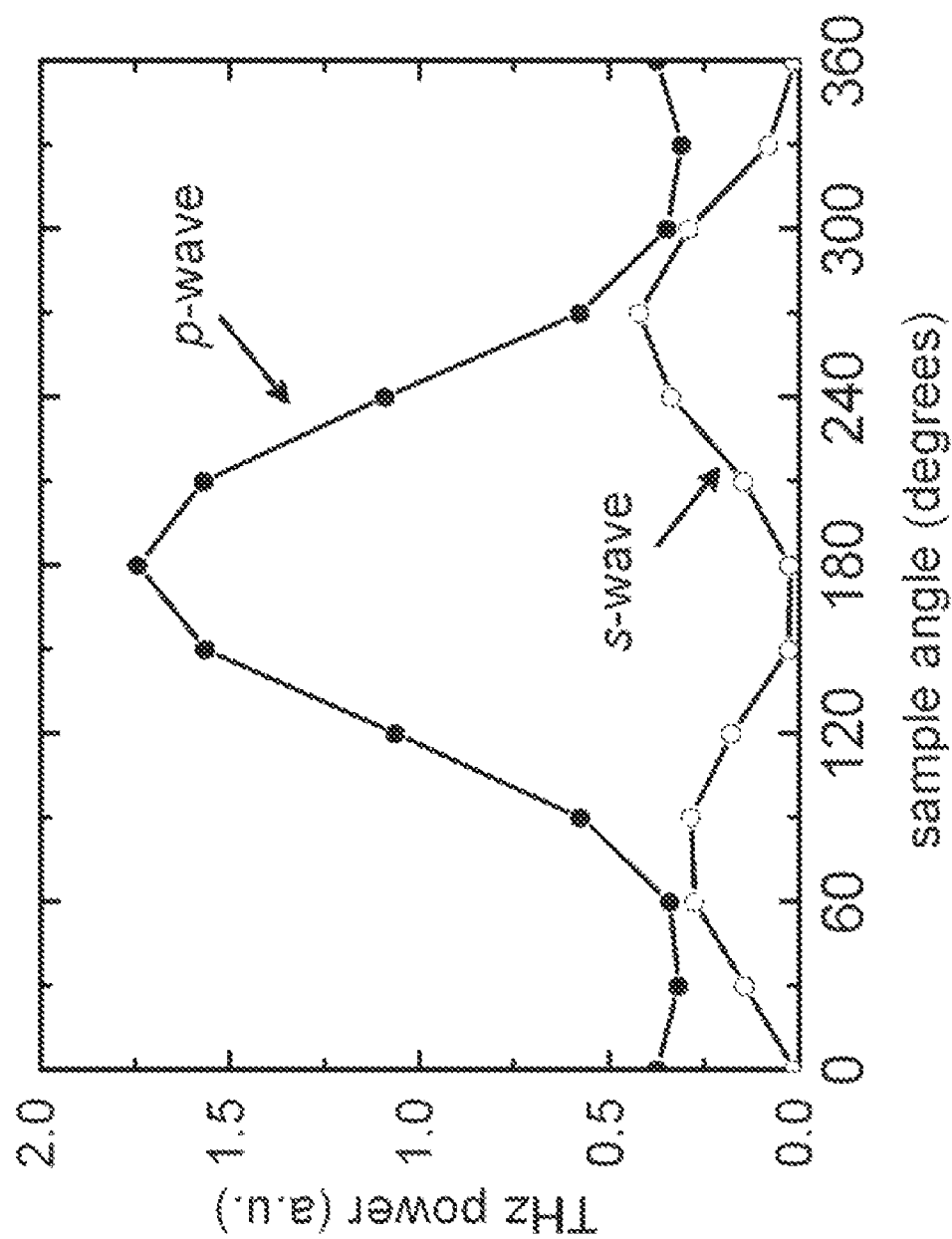
FIG. 19 is a graphical illustration showing the terahertz radiation power for the p-wave and s-wave components versus sample angle. Note that the maximum THz radiation power occurs for p-wave component at 180 degrees.
Figure 20:
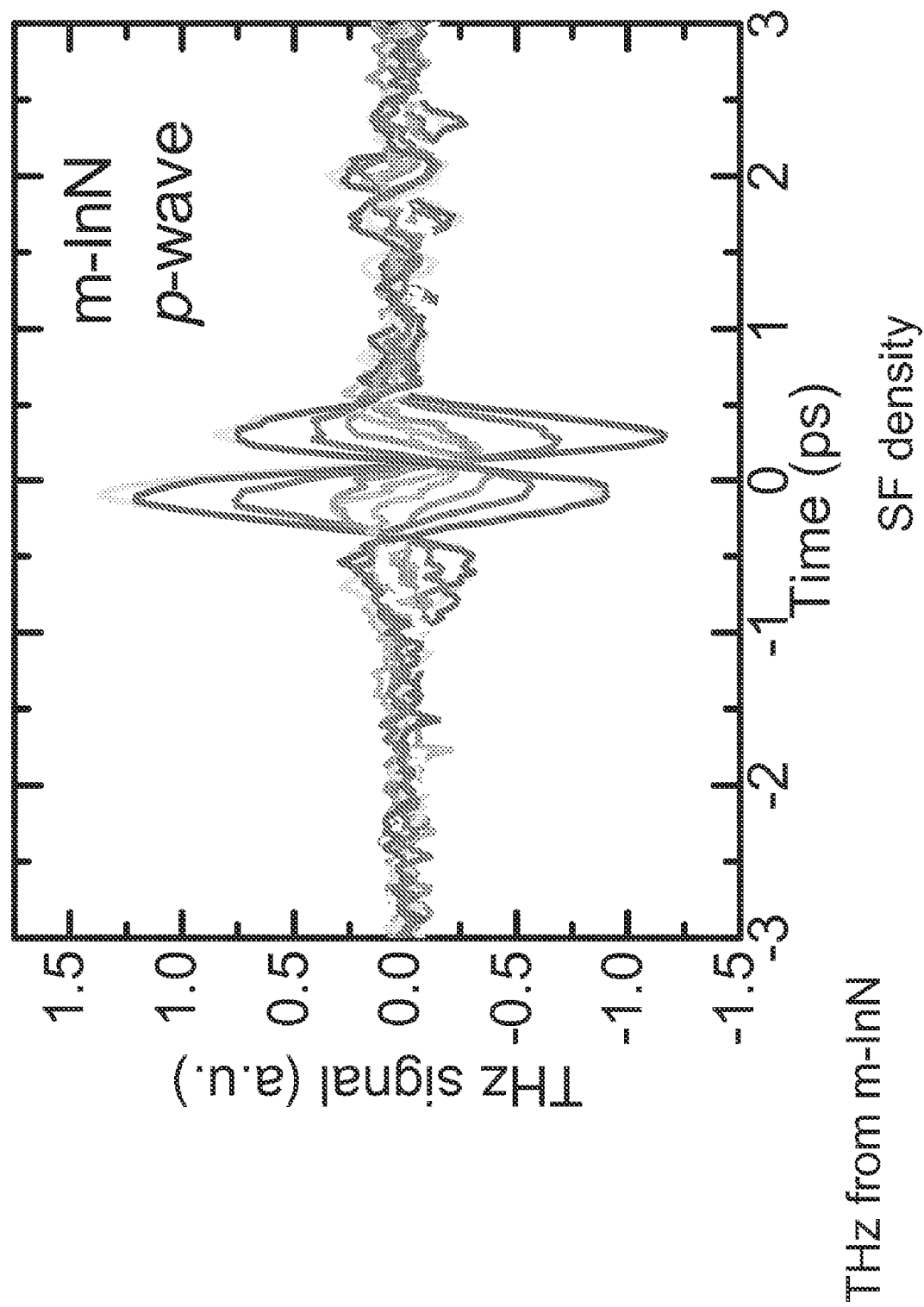
FIG. 20 is a graphical illustration of time-resolved p-wave THz signal amplitude from an m-plane InN epilayer at sample rotation angles ranging between 0° to 360°. The sample is excited with femtosecond laser pulses at 800 nm.

The maximum enhancement of the THz power from high SF density m-plane GaN occurs for p-polarized THz radiation when the c-axis is at 180 degrees, as displayed in FIG. 19. The THz power is the square of the time-integrated THz signal amplitude. The orientation of the c-axis is in the plane of incidence and aligned antiparallel to the projection of the excitation laser propagation direction onto the sample surface (FIG. 2A).

Figure 21:
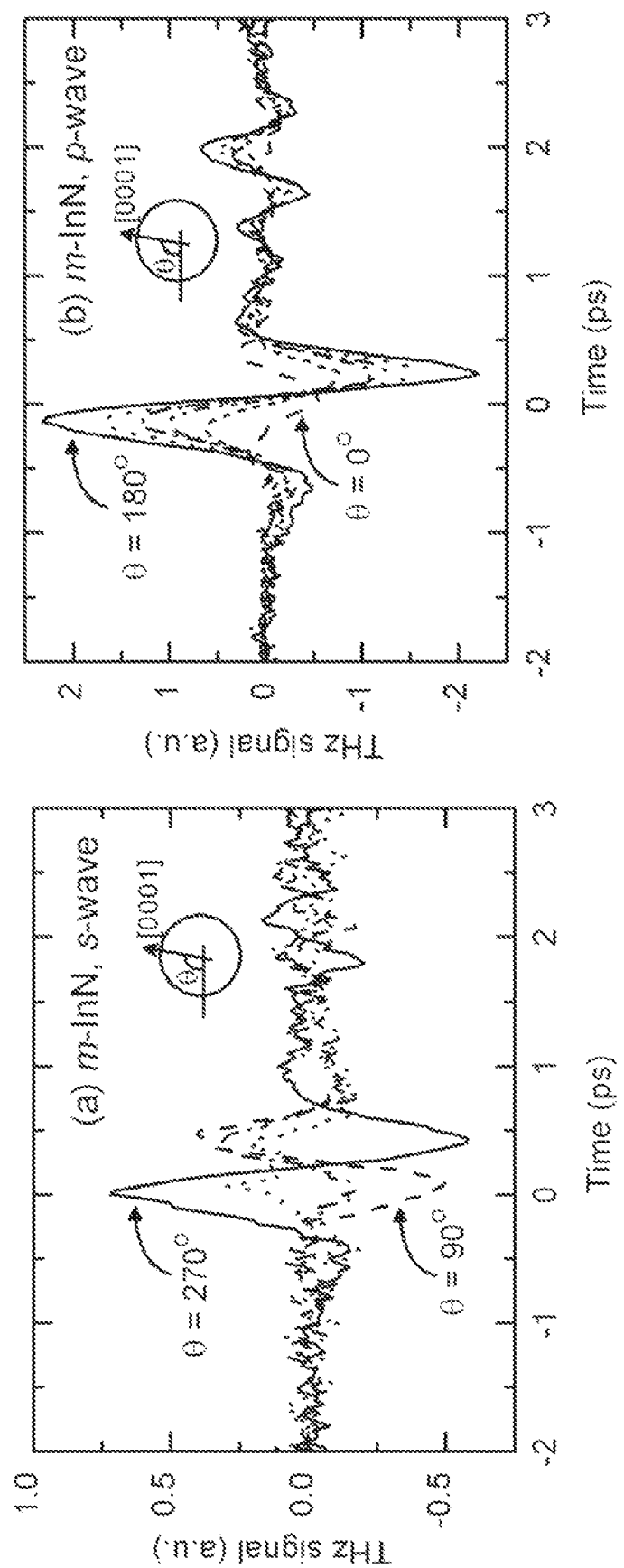
FIG. 21 is a graphical illustration of time-resolved (a) s-wave and (b) p-wave THz emission from an m-plane InN epilayer; the units for the p-wave being approximately twice that of the s-wave component. Note that the maximum THz signal intensity occurs for the p-wave component at 180°.

FIG. 21 shows (a) s-polarized and (b) p-polarized THz radiation from high SF density m-plane InN at sample rotation angles ranging from 0 degrees to 360 degrees. The measured s-polarized (p-polarized) THz waveform exhibits a polarity flip as the c-axis rotates, reaching maximum peak signal at Ø=270° (Ø=180°) and a minimum peak signal at Ø=90° (Ø=0°), similar to the THz signal from high SF density m-plane GaN (FIGS. 14A and 14B).

Figure 22:
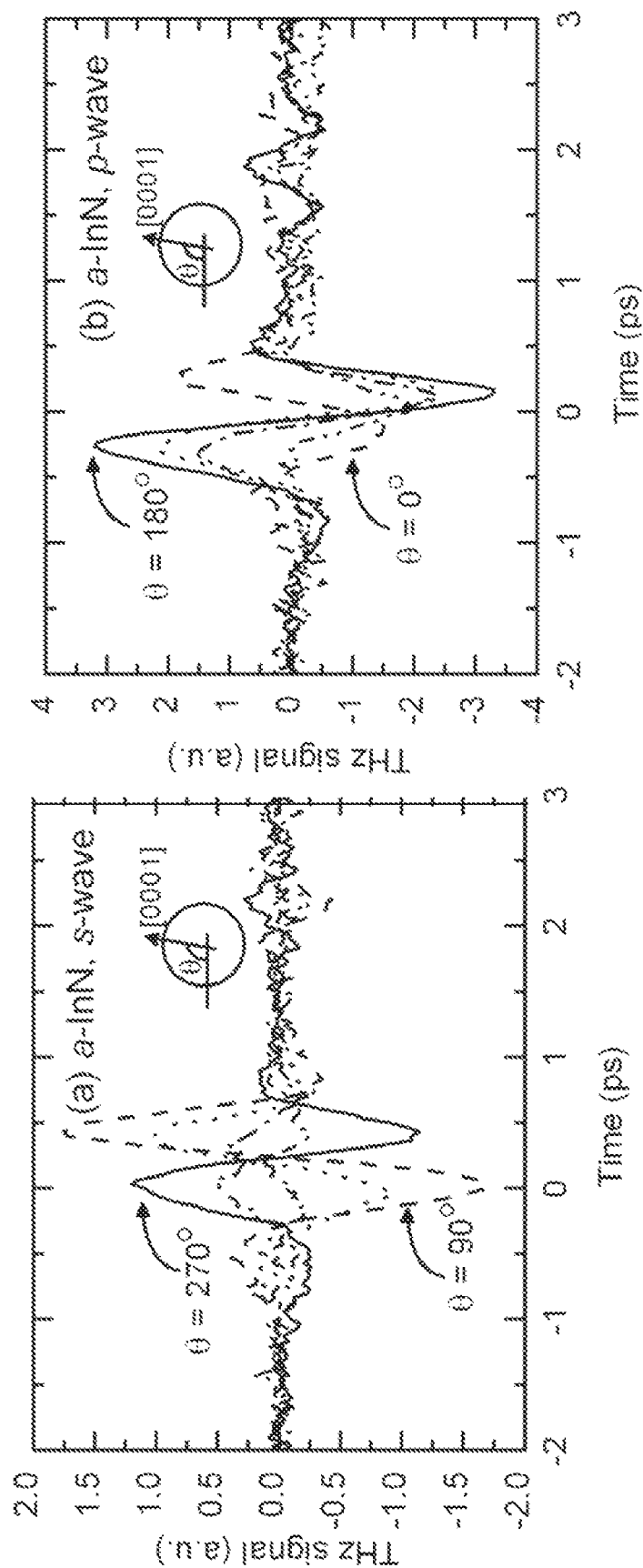
FIG. 22 is a graphical illustration of time-resolved THz emission for an a-plane InN; showing the p-wave and s-wave components; the units for the p-wave being approximately twice that of the s-wave component. Note that the maximum THz signal intensity occurs for the p-wave component at 180°.

FIG. 22 shows (a) s-polarized and (b) p-polarized THz radiation from high SF density a-plane InN at sample rotation angles ranging from 0 degrees to 360 degrees. The measured s-polarized (p-polarized) THz waveform exhibits a polarity flip as the c-axis rotates, reaching maximum peak signal at Ø=270° (Ø=180°) and a minimum peak signal at Ø=90° (Ø=0°), similar to the THz signal from high SF density m-plane GaN (FIGS. 14A and 14B) and InN (FIG. 21).

The term stacking fault as used herein means, for example, in situations where there are AB AB AB then any derivation from this order as well as any change in A or B is a stacking fault. It is also possible to have Zinc Blende and then have wurtzite as a stacking fault. However, wurtzite is a lower energy state than cubic for nitride semiconductors and tends to stay that way.

Although various preferred embodiments of the present invention have been described herein in detail to provide for complete and clear disclosure, it will be appreciated by those skilled in the art, that variations may be made thereto without departing from the spirit of the invention.

The terminology "outcoupling" as used herein refers to radiation going from one medium (such as a semiconductor) to another (such as air). The term "projection" as used in the following claims refers to a mathematical model vector projection. The terminology "in-plane" as used herein refers to a direction, such as carrier transport, lying in the surface plane of the polar crystal material. The terminology polarization of the emitted THz radiation relates to the direction of the electric field vector of the propagating THz wave. The terminology "nonsaturation region" used in relation to the pump power range refers to the operation range in which there is a constant ratio of terahertz emission out per excitation photons inputted. As used in the following claims, the term "device" is not intended to be limiting and includes an apparatus or system for producing terahertz radiation. Systems or devices of this nature are represented, for example, in FIGS. 5A, 5B, and 5C. The terminology "layer" as used in the following claims is not intended to be limiting; including as to size or dimension. The "layer" as used in the claims may be part of a composite device composed of various layers or the "layer" may be a part of a uniform material.

It should be emphasized that the above-described embodiments are merely possible examples of implementations. Many variations and modifications may be made to the above-described embodiments. All such modifications and variations are intended to be included herein within the scope of the disclosure and protected by the following claims.

The invention claimed is:

1. A device for generating terahertz radiation comprising:
a polar crystal material layer operative to emit terahertz radiation; the polar crystal material layer comprising a plurality of stacking faults; the stacking faults lying substantially perpendicular to the polar axis and forming boundaries at which the internal electric polarization terminates leading to charges accumulating at the boundaries, and creation of internal electric fields oriented along the polar axis;
a pulsed radiation source for creating photogenerated carriers in the polar crystal material;
whereby the photogenerated carriers accelerate in the internal electric fields associated with the termination of the internal electric polarization by the stacking faults to thereby generate terahertz radiation.

2. The device of claim 1 wherein the stacking faults are primarily perpendicular to the surface of the polar crystal material layer such that photogenerated carriers accelerate parallel to the polar crystal material layer surface leading to the improved outcoupling of the THz radiation.

3. The device of claim 1 wherein the polar crystal material is wurtzite semiconductor material and wherein the stacking faults result in the termination of the spontaneous and piezoelectric internal electric polarization along the c-axis of the wurtzite material.

4. The device of claim 1 wherein the polar crystal material layer is GaN, InN, AlN, or alloys thereof.

5. The device of claim 1 wherein the polar crystal material layer is ZnO, MgO, ZnS, ZnSe, ZnTe, or alloys thereof.

6. The device of claim 1 wherein the polar crystal material layer is SiC.

7. The device of claim 1 wherein the surface of the polar crystal material layer is a nonpolar wurtzite crystal plane or a semipolar wurtzite crystal plane which is not perpendicular to the polar axis of the polar crystal material layer and for which there is a projection of the polar axis on the surface.

8. The device of claim 1 wherein the polar crystal material is grown on a substrate such that growth proceeds in a nonpolar direction, with the polar crystal material's polar axis in-plane.

9. The device of claim 3 wherein the propagation direction of the pulsed radiation source and the emitted terahertz radiation define a plane of incidence relative to a surface of the polar crystal material, the c-axis of the polar crystal material lying within the plane of incidence and having a projection parallel to the surface, and a projection of the pulsed radiation source propagation direction onto the surface is antiparallel to the in-plane projection of the c-axis.

10. The device of claim 1 wherein the stacking faults are generated at densities of between $10^3$/cm to $10^7$/cm.

11. The device of claim 2 wherein the polarization of the emitted terahertz radiation due to photogenerated carrier transport parallel to the polar crystal material surface is along the polar axis.

12. A method generating terahertz radiation utilizing polar crystal material having a generally wurtzite crystal structure comprising:
growing a polar crystal material such that the c-axis is not perpendicular to the growth plane and with stacking faults in the polar crystal material oriented substantially perpendicular to the c-axis;
irradiating the surface of the polar crystal material with a pulsed radiation source in a plane of incidence within which the polar axis of the material lies;
creating terahertz radiation propagated in the plane of incidence.

13. The method of claim 12 wherein the step of growing a polar crystal material comprising growing the polar crystal material on a lattice mismatched substrate to thereby purposely create stacking faults.

14. The method of claim 12, wherein the step of irradiating the surface comprises propagating the pulsed radiation source of pulse duration less than one picosecond at a direction in a plane of incidence relative to a polar crystal surface such that a projection of the pulsed radiation source propagation direction onto the polar crystal surface is antiparallel to the in-plane projection of the c-axis.

15. The method of claim 12 wherein the in-plane internal electric polarization of the wurtzite crystalline structure is terminated by stacking faults, creating interfaces and charge accumulation at the interfaces leading to the occurrence of strong electric fields parallel to the c-axis of the crystal, such that in-plane transport of photoexcited carriers excited by pulsed radiation source of pulse duration less than one picosecond proceeds parallel to the electric field, leading to a terahertz radiation component polarized preferentially along this axis of the crystal material.

16. The method of claim 12 wherein the terahertz signal produced exhibits a 360 degree periodicity with sample rotation and a flip of the terahertz waveform polarity results from rotating the c-axis by 180 degrees which also rotates the direction of the built-in electric filed by 180 degrees causing the photoexcited carriers to accelerate in the opposite direction.

17. The method of claim 12 wherein the polar crystal material layer is at least approximately 50 nanometer thick and is grown by vapor deposition or epitaxy on a polar or semipolar substrate.

18. The method of claim 12 wherein the crystal material comprises nonpolar nitride-based materials, such as GaN, InN, AlN or alloys thereof.

19. The method of claim 12 wherein the crystal material comprises a plurality of alternating layers of nonpolar or semipolar nitride-based materials.

20. The method of claim 12 wherein the crystal material is irradiated using a pulsed radiation source with an energy in the approximate range of 1 to 25 nano-joules, a wavelength of 200-1800 nanometer, and a pulse duration in the approximate range of 10 to 300 femtoseconds, a pump beam spot size in the approximate range 0.5 to 2 millimeters, and an angle of incidence in the approximate range of 30 to 60 degrees, and wherein the subsequent terahertz emission is collected with a pair of parabolic mirrors onto an electro-optic crystal such as ZnTe for electro-optic sampling and wherein the ZnTe-based terahertz electro-optic detection system is polarization sensitive, enabling analysis of the polarization of the terahertz radiation.

* * * * *